(12) United States Patent
Anneboina et al.

(10) Patent No.: US 11,436,361 B2
(45) Date of Patent: *Sep. 6, 2022

(54) COMPUTER-IMPLEMENTED METHODS, SYSTEMS COMPRISING COMPUTER-READABLE MEDIA, AND ELECTRONIC DEVICES FOR SECURE MULTI-DATASOURCE QUERY JOB STATUS NOTIFICATION

(71) Applicant: Mastercard International Incorporated, Purchase, NY (US)

(72) Inventors: Vikranth Kumar Anneboina, Dardenne Prairie, MO (US); Sandeep Chakravarthy Chimakurthi, Ellisville, MO (US); Matthew Edward Hopkins, Saint Charles, MO (US)

(73) Assignee: Mastercard International Incorporated, Purchase, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/990,485

(22) Filed: Aug. 11, 2020

(65) Prior Publication Data

US 2020/0372171 A1 Nov. 26, 2020

Related U.S. Application Data

(63) Continuation of application No. 16/156,223, filed on Oct. 10, 2018, now Pat. No. 10,776,509.

(Continued)

(51) Int. Cl.
*G06F 16/23* (2019.01)
*G06F 21/62* (2013.01)
*G06F 16/2455* (2019.01)
*G06F 16/16* (2019.01)
*H04L 29/06* (2006.01)
(Continued)

(52) U.S. Cl.
CPC ........ *G06F 21/6227* (2013.01); *G06F 16/148* (2019.01); *G06F 16/164* (2019.01); *G06F 16/2358* (2019.01); *G06F 16/2455* (2019.01); *G06F 16/24578* (2019.01);
(Continued)

(58) Field of Classification Search
CPC ............. G06F 16/9535; G06F 16/2358; G06F 16/2455; G06F 16/148; G06F 16/164; G06F 21/00; G06F 21/6227; G06F 16/24578; G06F 16/2471; G06F 16/951; H04L 63/105; H04L 63/102; H04L 63/10
See application file for complete search history.

(56) References Cited

U.S. PATENT DOCUMENTS 10,331,895 B1 * 6/2019 Roth .................... G06F 21/6209
10,776,509 B2 * 9/2020 Anneboina ........... G06F 16/951
(Continued)

*Primary Examiner* — Mohammad A Siddiqi
(74) *Attorney, Agent, or Firm* — Hovey Williams LLP

(57) ABSTRACT

A computer-implemented method for secure multi-datasource query job status notification that includes accessing notification characteristics for a query job status. Occurrence of the query job status and a present security level may be determined. Based on the notification characteristics, a notification may be generated at least in part by omitting available data based on the present security level. Based at least in part on the occurrence of the query job status, transmission of the notification to an end user computing device may be directed.

17 Claims, 9 Drawing Sheets

Related U.S. Application Data

(60) Provisional application No. 62/657,463, filed on Apr. 13, 2018.

(51) Int. Cl.
    *G06F 16/14*         (2019.01)
    *G06F 16/9535*     (2019.01)
    *G06F 16/2457*     (2019.01)
    *G06F 16/951*      (2019.01)
    *H04L 9/40*         (2022.01)

(52) U.S. Cl.
    CPC ........ *G06F 16/951* (2019.01); *G06F 16/9535* (2019.01); *H04L 63/10* (2013.01)

(56) References Cited

U.S. PATENT DOCUMENTS

| | | | |
|---|---|---|---|
| 11,275,850 B1* | 3/2022 | Brandwine | G06F 21/6227 |
| 2008/0154873 A1* | 6/2008 | Redlich | G06F 16/951 |
| | | | 707/999.005 |
| 2010/0250497 A1* | 9/2010 | Redlich | H04L 63/105 |
| | | | 707/661 |
| 2011/0282862 A1* | 11/2011 | Loeb | G06F 16/3344 |
| | | | 707/E17.108 |
| 2012/0096046 A1* | 4/2012 | Kucera | H04L 67/306 |
| | | | 707/802 |
| 2014/0108103 A1* | 4/2014 | Romaine | G06Q 10/06398 |
| | | | 705/7.41 |
| 2019/0253509 A1* | 8/2019 | Kumar | H04L 63/08 |

* cited by examiner

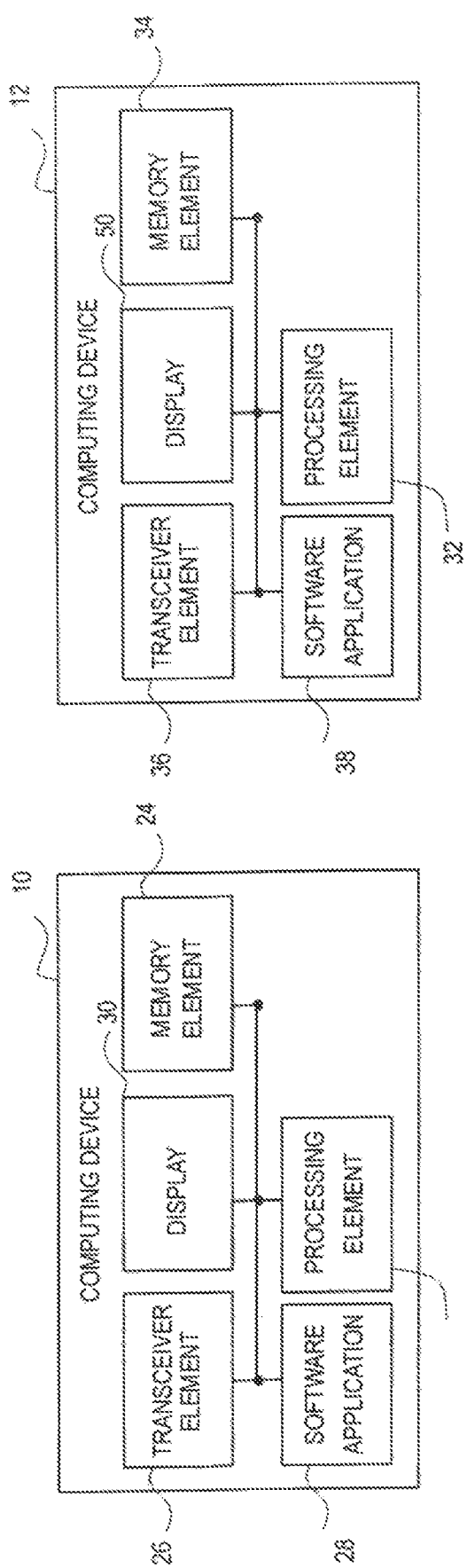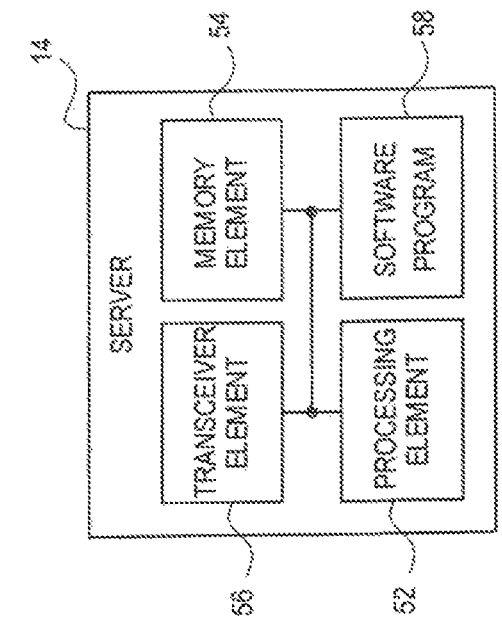
FIG. 2
FIG. 3
FIG. 4

COMPUTER-IMPLEMENTED METHODS, SYSTEMS COMPRISING COMPUTER-READABLE MEDIA, AND ELECTRONIC DEVICES FOR SECURE MULTI-DATASOURCE QUERY JOB STATUS NOTIFICATION

RELATED APPLICATIONS

1. Priority Applications

The current patent application is a continuation patent application which claims priority benefit with regard to all common subject matter to identically-titled U.S. patent application Ser. No. 16/156,223, filed Oct. 10, 2018, which, itself, claims priority to U.S. Patent Application Ser. No. 62/657,463, entitled COMPUTING DEVICE, SOFTWARE, AND COMPUTER-IMPLEMENTED METHOD FOR QUERYING RESTRICTED-ACCESS DATASOURCES, filed Apr. 13, 2018. The listed earlier-filed provisional and non-provisional applications are hereby incorporated by reference in their entireties into the current patent application.

2. Other Related Applications

The parent non-provisional application referenced above was filed contemporaneously with three other U.S. patent applications, each claiming priority to U.S. Patent Application Ser. No. 62/657,463, filed Apr. 13, 2018. These contemporaneous applications—all filed on Oct. 10, 2018—are U.S. patent application Ser. No. 16/156,202, entitled COMPUTER-IMPLEMENTED METHODS, SYSTEMS COMPRISING COMPUTER-READABLE MEDIA, AND ELECTRONIC DEVICES FOR PROPAGATING ACCESS TO ASSETS ACROSS A PLURALITY OF DATASOURCES; U.S. patent application Ser. No. 16/156,213, entitled COMPUTER-IMPLEMENTED METHODS, SYSTEMS COMPRISING COMPUTER-READABLE MEDIA, AND ELECTRONIC DEVICES FOR COMPLETING QUERIES PROPAGATED ACROSS A PLURALITY OF DATASOURCES; and U.S. patent application Ser. No. 16/156,216, entitled COMPUTER-IMPLEMENTED METHODS, SYSTEMS COMPRISING COMPUTER-READABLE MEDIA, AND ELECTRONIC DEVICES FOR QUERYING RESTRICTED-ACCESS DATASOURCES. The entire disclosure of each of the aforementioned contemporaneous applications is hereby incorporated herein by reference.

FIELD OF THE INVENTION

The present disclosure generally relates to computer-implemented methods, systems comprising computer-readable media, and electronic devices for querying restricted-access datasources.

BACKGROUND

Existing business intelligence tools may be queried using customized scripts, application programming interfaces or the like. In some instances, a subscriber of such a tool may develop a software application configured to provide user access to the business intelligence data via a user interface. System architecture may permit the software application to call a module for accessing the business intelligence tool upon user request.

A user may log into the software application and access functionality for performing a query of the business intelligence tool. The module of the software application may request and accept input from the user for specifying arguments and parameters required to query the tool. The software application may be queried, in turn, for authorization information by the business intelligence tool. Once results have been received from the query, the user may launch another application seeking data from a different business intelligence tool and may repeat the search process again for each tool from which business intelligence data is desired.

This background discussion is intended to provide information related to the present invention which is not necessarily prior art.

BRIEF SUMMARY

Embodiments of the present technology relate to computer-implemented methods, systems comprising computer-readable media, and electronic devices for generating notifications relating to job statuses of restricted-access datasource queries. The embodiments may enable generation of a notification reflecting responsive results from a plurality of datasources according to a single set of notification characteristics. The embodiments may also enable unified redaction of a notification relating to a combined results list from the plurality of datasources according to a single determination of a present security level.

More particularly, in a first aspect, a computer-implemented method for secure multi-datasource query job status notification may be provided. The method may include automatically accessing notification characteristics for a query job status. Occurrence of the query job status may be automatically determined, and an initial version of a notification at least in part based on the notification characteristics may be automatically generated. A present security level may be automatically determined by analyzing at least one of end user activity and an aspect of an end user computing device. A final version of the notification may be automatically generated at least in party by redacting the initial version based on the present security level. Transmission of the final version of the notification to the end user computing device may be automatically instructed. The method may include additional, less, or alternate actions, including those discussed elsewhere herein.

In another aspect, a system for secure multi-datasource query job status notification may be provided. The secure notification system may include one or more processors individually or collectively programmed to perform the steps described in this paragraph. Notification characteristics for a query job status may be automatically accessed. Occurrence of the query job status may be automatically determined, and an initial version of a notification at least in part based on the notification characteristics may be automatically generated. A present security level may be automatically determined by analyzing at least one of end user activity and an aspect of an end user computing device. A final version of the notification may be automatically generated at least in party by redacting the initial version based on the present security level. Transmission of the final version of the notification to the end user computing device may be automatically instructed. The system may include additional, less, or alternate functionality, including that discussed elsewhere herein.

In still another aspect, a system comprising computer-readable media having computer-executable instructions stored thereon for secure multi-datasource query job status notification may be provided. The computer-readable instructions may instruct at least one processor to perform the steps described in this paragraph. Notification characteristics for a query job status may be automatically accessed. Occurrence of the query job status may be automatically determined, and an initial version of a notification at least in part based on the notification characteristics may be automatically generated. A present security level may be automatically determined by analyzing at least one of end user activity and an aspect of an end user computing device. A final version of the notification may be automatically generated at least in party by redacting the initial version based on the present security level. Transmission of the final version of the notification to the end user computing device may be automatically instructed. The computer-readable instructions may instruct the processor(s) to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

FIGS. 2 and 3 illustrate various components of exemplary computing devices shown in block schematic form that may be used with the system of FIG. 1;

FIG. 4 illustrates various components of an exemplary server shown in block schematic form that may be used with the system of FIG. 1;

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Existing platforms for querying an application programming interface (API) to obtain business intelligence data are configured to optimize a user experience in view of the configuration employed by the API. Such platforms may assist the user in executing precise queries, and may store the results at the request of the user. However, existing platforms are sluggish where a user intends to gather business intelligence data from multiple APIs implementing diverse architectural frameworks and/or authorization schemas.

According to embodiments of the present invention, a developer may utilize a platform to unify access to provisionable assets across a plurality of tools utilizing a plurality of datasource structures, syntaxes, formats, languages or the like. Embodiments of the platform may be configured to permit individual configurations, settings and/or access details to be defined once by a developer and propagated automatically across the various tools into automated scripts and database entries for automated querying of restricted-access datasources in response to a single end user query. According to embodiments of the present invention, individual filters, search queries, user login operations and the like may be input once by an end user and propagated automatically as search queries across the various tools. Responsive results may be automatically gathered from the various tools and translated, converted and/or otherwise reformatted into a common form and ranked by the platform for presentation to the end user.

Further, in embodiments where at least some end user authentication/authorization information is stored at the level of the tools, the platform may be configured to automatically propagate any changes to an end user's authentication/authorization information across such tools. Still further, job processing may be unified and consolidated, and individual notification configurations, settings and/or contents may be defined once by the developer and/or end user and propagated automatically across jobs invoking a variety of tools.

Exemplary System

Figure 1:
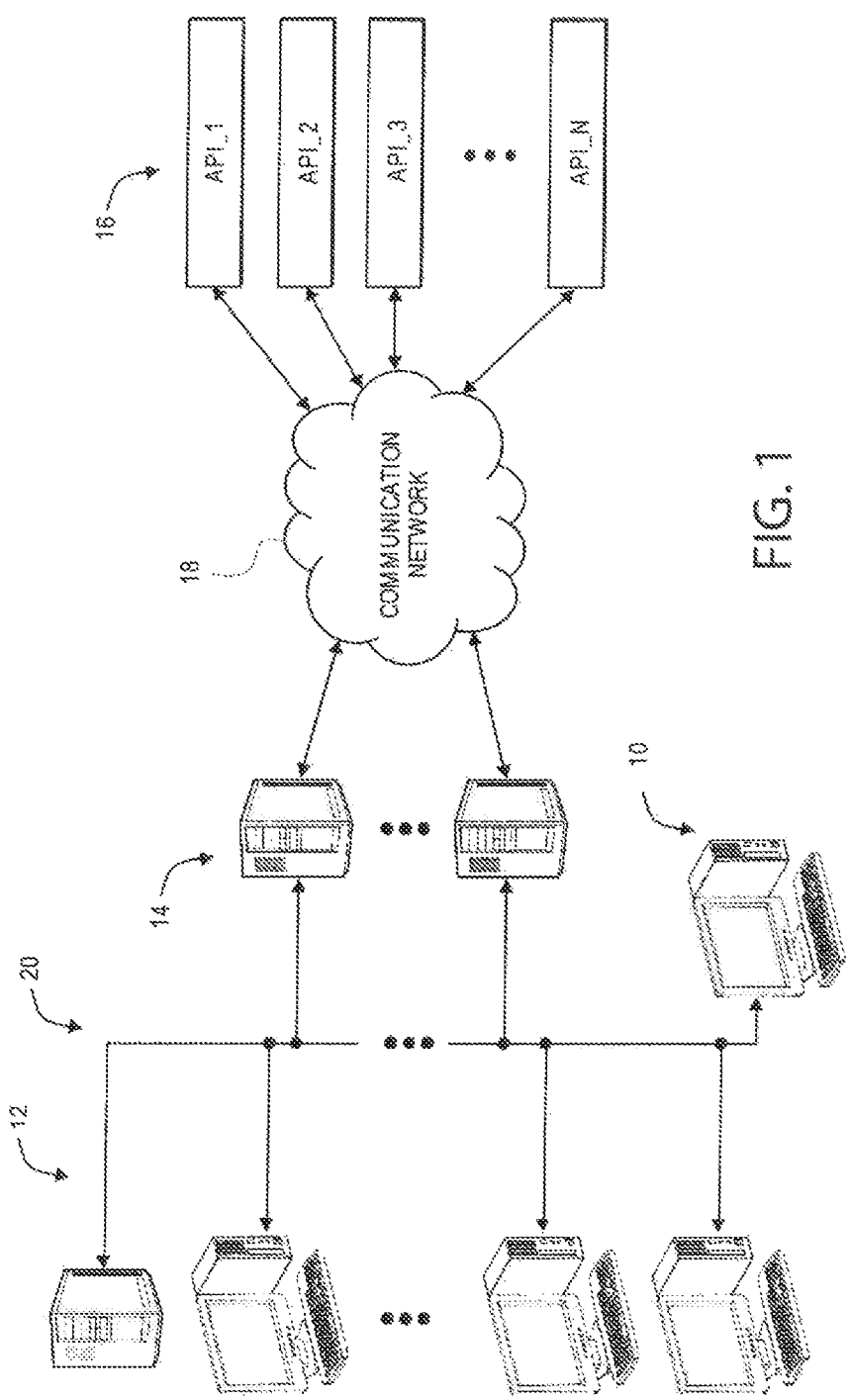
FIG. 1 illustrates various components, in block schematic form, of an exemplary system for querying restricted-access datasources in accordance with embodiments of the present invention.

FIG. 1 depicts an exemplary environment for querying restricted-access datasources according to embodiments of the present invention. The environment may include a plurality of computers 10, 12, a plurality of servers 14, a plurality of application programming interfaces (APIs) 16, and a communication network 18. The computers 10, 12 and the servers 14 may be located within network boundaries of a large organization, such as a corporation, a government office, a university, a college, or the like. The communication network 18 and the APIs 16 may be external to the organization, for example where the APIs 16 are offered by data vendors managing restricted-access datasources.

More particularly, the computers 10, 12 and servers 14 may be connected to an internal network 20 of the organization, which may comprise a trusted internal network or the like. Alternatively or in addition, the computers 10, 12 and servers 14 may manage access to the APIs 16 and/or restricted-access datasources under a common authentication management framework. Each user of a device 10, 12, may be required to complete an authentication process to query restricted-access datasources via the servers 14. In an embodiment, one or more computers 12 may not be internal to the organization, but may be permitted access to perform the queries via the common authentication management framework. For instance, the common authentication management framework may comprise one or more servers made available under Web SEAL® (a registered trademark of International Business Machines Corporation) as of the date of initial filing of the present disclosure. Moreover, all or some of the APIs 16 and/or restricted-access datasources may be maintained and/or owned by the organization and/or may be maintained on the internal network 20 within the scope of the present invention. One of ordinary skill will appreciate that the servers 14 may be free of, and/or subject to different protocol(s) of, the common authentication management framework within the scope of the present invention.

Assets stored at restricted-access datasources and made available via the APIs 16 may include business intelligence (BI) data. BI data may inform users to enable them to improve operational efficiencies, products/services, marketing, customer retention, risk reduction, or the like on behalf of user organizations. For instance, the servers 14 may be maintained by a payment network organization, and an authenticated employee of a financial institution may access an exemplary system implemented on the servers 14 to query restricted-access datasources via the APIs 16 and obtain customer transaction data to identify fraudulent activities. An employee of the payment network organization may also access such an exemplary system from a computer 12 to query the restricted-access datasources via APIs 16 to identify fraudulent activities. One of ordinary skill will appreciate that embodiments may serve a wide variety of organizations and/or rely on a wide variety of datasources within the scope of the present invention. For example, one or more datasources accessed by a system according to embodiments of the present invention may be available to the public.

The computers 10, 12 may be workstations, as described in more detail below. The computer 10 may be operated by a developer and/or administrator. The developer may build user applications at computer 10 for deployment and use by users at computers 12. The administrator may define access rights at computer 10 for provisioning user queries to restricted-access datasources via the user applications. In an embodiment, the same individual performs developer and administrator tasks.

Turning to FIGS. 2-3, generally the computers 10, 12 may include tablet computers, laptop computers, desktop computers, workstation computers, smart phones, smart watches, and the like. In addition, the computers 10, 12 may include copiers, printers, routers and any other device that can connect to the internal network 20 and/or the communication network 18. Each computer 10, 12 may respectively include a processing element 22, 32 and a memory element 24, 34. Each computer 10, 12 may also respectively include circuitry capable of wired and/or wireless communication with the internal network 20 and/or the communication network 18, including, for example, transceiver elements 26, 36. Further, the computers 10, 12 may respectively include a software application 28, 38 configured with instructions for performing and/or enabling performance of at least some of the steps set forth herein. In an embodiment, the software applications 28, 38 comprise programs stored on computer-readable media of memory elements 24, 34. Still further, the computers 10, 12 may respectively include a display 30, 50.

Generally, the servers 14 act as a bridge between the computers 10, 12 and/or internal network 20 of the organization on the one hand, and the communication network 18 and APIs 16 of the outside world on the other hand. In an embodiment, the servers 14 also provide communication between the computers 10, 12 and internal APIs 16, as discussed above. The servers 14 may include a plurality of proxy servers, web servers, communications servers, routers, load balancers, and/or firewall servers, as are commonly known.

The servers 14 also generally implement a platform (see FIGS. 5-6) for managing queries to, and responsive assets (e.g., resources including data, files and the like) received from, APIs 16 and/or restricted-access datasources, and for performing related functions. It is foreseen that the servers 14 may interact directly with restricted-access datasources (i.e., without API 16 intermediary(ies)) without departing from the spirit of the present invention (see FIG. 6). The servers 14 may retain electronic data and may respond to requests to retrieve data as well as to store data. The servers 14 may comprise domain controllers, application servers, database servers, file servers, mail servers, catalog servers or the like, or combinations thereof. In an embodiment, one or more restricted-access datasources and/or APIs 16 may be maintained by one or more of the servers 14. Generally, each server 14 may include a processing element 52, a memory element 54, a transceiver element 56, and a software program 58.

Each API 16 may include and/or provide access to one or more pages or sets of data and/or other content accessed through the World Wide Web (e.g., through the communication network 18) and/or through the internal network 20. Each API 16 may be hosted by or stored on a web server and/or database server, for example. The APIs 16 may include top-level domains such as ".com", ".org", ".gov", and so forth. The APIs 16 may be accessed using software such as a web browser, through execution of one or more script(s) for obtaining BI data, and/or by other means for interacting with APIs without departing from the spirit of the present invention.

The communication network 18 generally allows communication between the servers 14 of the organization and external APIs such as data vendor APIs 16. The communication network 18 may also generally allow communication between the computers 10 and/or 12 and the servers 14, for example in conjunction with the common authentication framework discussed above and/or secure transmission protocol(s). The internal network 20 may generally allow communication between the computers 10, 12 and the servers 14. The internal network 20 may also generally allow communication between the servers 14 and internal APIs 16 and/or internal restricted-access datasources.

The communication networks 18, 20 may include the Internet, cellular communication networks, local area networks, metro area networks, wide area networks, cloud networks, plain old telephone service (POTS) networks, and the like, or combinations thereof. The communication networks 18, 20 may be wired, wireless, or combinations thereof and may include components such as modems, gateways, switches, routers, hubs, access points, repeaters, towers, and the like. The computers 10, 12, servers 14 and/or APIs 16 may, for example, connect to the communication networks 18, 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

Figure 5:
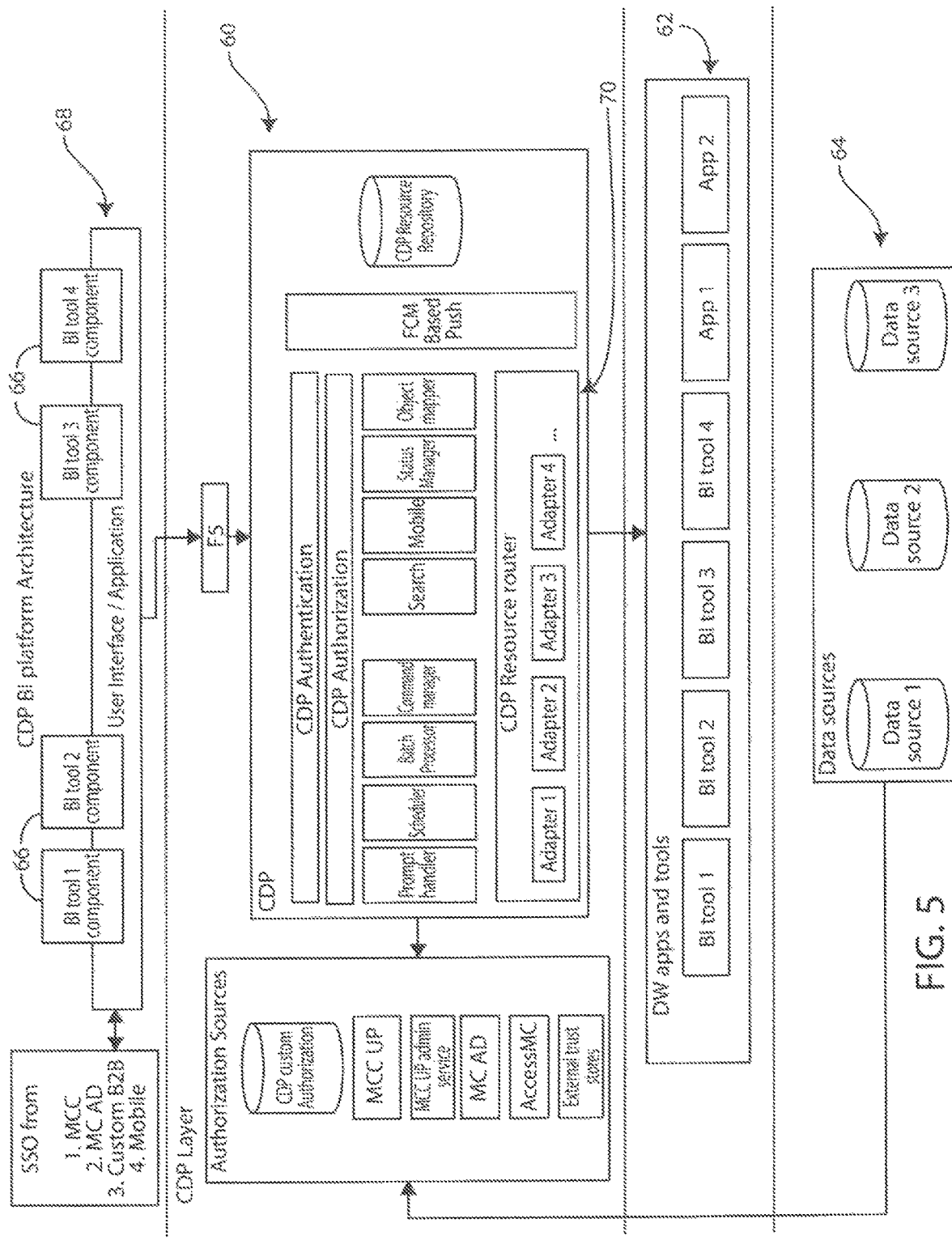
FIG. 5 is a flowchart of various components of exemplary systems for querying restricted-access datasources, and of relationships between the components, in accordance with embodiments of the present invention.
Figure 6:
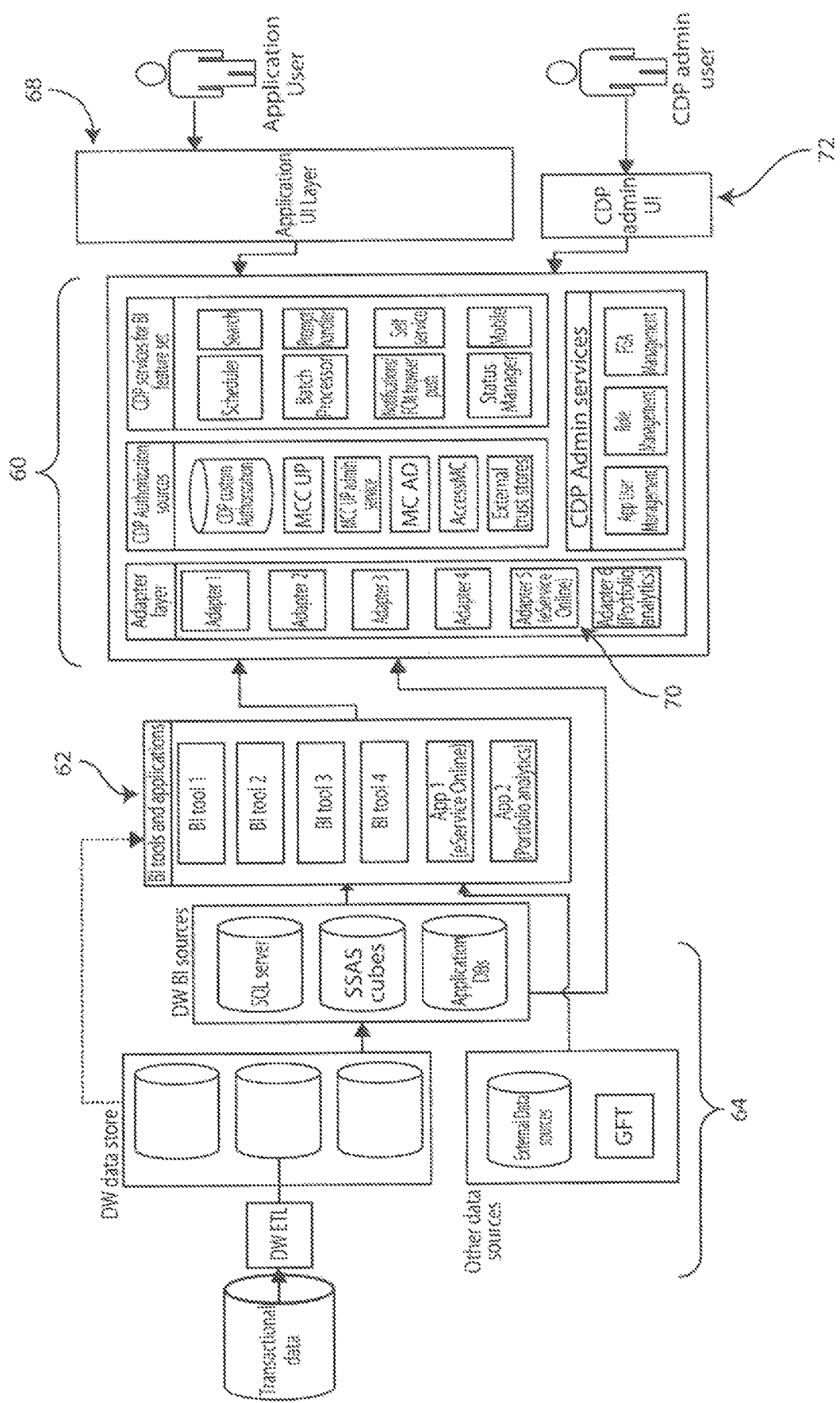
FIG. 6 is a flowchart of various components of exemplary systems for querying restricted-access datasources, and of relationships between the components, in accordance with embodiments of the present invention.

The transceiver elements 26, 36, 56 generally allow communication between the computers 10, 12, the servers 14, the communication networks 18, 20, the APIs 16 and/or the restricted-access datasources (see FIGS. 5-6). The transceiver elements 26, 36, 56 may include signal or data transmitting and receiving circuits, such as antennas, amplifiers, filters, mixers, oscillators, digital signal processors (DSPs), and the like. The transceiver elements 26, 36, 56 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the transceiver elements 26, 36, 56 may utilize communication standards such as ANT, ANT+, Bluetooth™ low energy (BLE), the industrial, scientific, and medical (ISM) band at 2.4 gigahertz (GHz), or the like. Alternatively, or in addition, the transceiver elements 26, 36, 56 may establish communication through connectors or couplers that receive metal conductor wires or cables, like Cat 6 or coax cable, which are compatible with networking technologies such as ethernet. In certain embodiments, the transceiver elements 26, 36, 56 may also couple with optical fiber cables. The transceiver elements 26, 36, 56 may respectively be in communication with the processing elements 22, 32, 52 and/or the memory elements 24, 34, 54.

The memory elements 24, 34, 54 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 24, 34, 54 may be embedded in, or packaged in the same package as, the processing elements 22, 32, 52. The memory elements 24, 34, 54 may include, or may constitute, a "computer-readable medium." The memory elements 24, 34, 54 may store the instructions, code, code segments, software, firmware, programs, applications, apps, services, daemons, or the like that are executed by the processing elements 22, 32, 52. In an embodiment, the memory elements 24, 34, 54 respectively store the software applications/program 28, 38, 58. The memory elements 24, 34, 54 may also store settings, data, documents, sound files, photographs, movies, images, databases, and the like.

The processing elements 22, 32, 52 may include electronic hardware components such as processors. The processing elements 22, 32, 52 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 32, 52 may generally execute, process, or run instructions, code, code segments, software, firmware, programs, applications, apps, processes, services, daemons, or the like. For instance, the processing elements 22, 32, 52 may respectively execute the software applications/program 28, 38, 58. The processing elements 22, 32, 52 may also include hardware components such as finite-state machines, sequential and combinational logic, and other electronic circuits that can perform the functions necessary for the operation of the current invention. The processing elements 22, 32, 52 may be in communication with the other electronic components through serial or parallel links that include universal busses, address busses, data busses, control lines, and the like.

Turning to FIG. 5, the servers 14 may embody a platform 60 (otherwise referred to herein as a "common delivery platform," a "CDP Layer" or the like) for managing queries to, and responsive assets received from, APIs 16 and/or restricted-access datasources, and for performing related functions in accordance with the description set forth herein. The APIs 16 may be embodied by BI tools 62, which may provide, comprise and/or communicate with database management software for querying datasources 64.

Queries may be initiated via BI tool components 66 of a User Interface/Application 68. The User Interface/Application 68 may be embodied, controlled and/or executed by a computer 12. The User Interface/Application 68 may be hosted by a server 14 (e.g., a web server or the like) without departing from the spirit of the present invention, for instance where the User Interface/Application 68 is accessed remotely by a computer 12 that is external to an organization managing the platform 60. In an embodiment, access to the User Interface/Application 68 is granted via the common authentication framework, such as through known single sign-on (SSO) processes.

The datasources 64 may utilize a variety of formats and structures within the scope of the invention. For instance, relational databases and/or object-oriented databases may embody the datasources 64. Similarly, the BI tools 62 may utilize a variety of formats and structures within the scope of the invention. For instance, the BI tools 62 may embody and/or utilize Simple Object Access Protocol (SOAP), Remote Procedure Call (RPC), and/or Representational State Transfer (REST) types. One of ordinary skill will appreciate that—while examples presented herein may discuss specific types of tools and/or databases—a wide variety may be used alone or in combination within the scope of the present invention.

In an embodiment, the BI tools 62 available to the platform 60 may employ a variety of architectures and/or types. The platform 60 may correspondingly include a plurality of adapters 70. Each adapter 70 may be specialized to translate and/or configure queries to, and responsive assets received from, one or more compatible BI tools 62 and/or datasources 64. In an embodiment, each adapter 70 is configured to translate a query from a User Interface/Application 68 into the specific syntax, format and language required for submission to a corresponding BI tool 62 (e.g., according to the requirements of an API and/or application of the BI tool 62). Each adapter 70 may also be configured to implement and/or comply with one or more authentication/authorization protocols required by the corresponding BI tool 62, such as by translating authentication/authorization credentials and/or identity information of the end user into a required form (e.g., a token), and/or exchanging such information in the manner required by the BI tool 62. Moreover, each adapter 70 may be configured to translate responsive assets received from the corresponding BI tool 62 into a standardized format utilized broadly by the platform 60.

For example, a BI tool 62 may comprise a REST API. The BI tool 62 may be configured to receive string queries and return responsive resources of the datasource 64. The responsive resources may be made available in JavaScript Object Notation (JSON) format. The adapter 70 may accordingly be configured to: (1) receive a query from the User Interface/Application 68; (2) retrieve one or more corresponding resource paths (e.g., universal resource identifiers (URIs)) for the BI tool 62, such as by requesting the URIs from the CDP Resource Repository component (discussed below); (3) translate the query according to the string query syntax preferred by the BI tool 62 and using the particular parameters, arguments, resource names and/or identifiers employed by the BI tool 62; (4) submit a properly translated string query to the BI tool 62; (5) receive responsive resources, and/or retrieve same via a link thereto provided by, the BI tool 62; (6) parse and/or translate responsive resources from JSON format to a more universal structured format of the platform 60 (e.g., a table structured format); and (7) provide the translated responsive resources to other platform 60 components for ranking and other steps outlined herein. One of ordinary skill will appreciate that the aforementioned example is merely illustrative, and that adapters 70 may be configured to perform one or more of these steps for data queries and retrieval with a variety of datasource structures, syntaxes, formats, languages or the like within the scope of the present invention. Moreover, it is foreseen that certain steps outlined in or appreciated from the description above may be performed prior to receiving a query—for instance where scripted instructions, partial translations, filters or other aspects are prepared in anticipation of the query in connection with development processes described in connection with FIGS. 7-8 below—without departing from the spirit of the present invention.

Each adapter 70 may also be configured to append metadata regarding users, user authentication/authorization, queries, and/or query results as needed to complete query and retrieval/display processes, as discussed in more detail below. The platform 60 may include a resource router configured to direct queries and/or responsive results to and from appropriate adapter(s) 70.

The platform 60 may include applications/programs 28, 38, 58, conceptually and/or programmatically delineated functions, modules, libraries, subroutines, programs or the like, or combinations thereof, for performing one or more of the steps outlined herein. In the embodiments of FIGS. 5-6, these may include the following:

(A) Prompt Handler Component.

The Prompt Handler component may modify a query and/or responsive assets to narrow the content of the results provided to the User Interface/Application 68. For instance, the Prompt Handler component may append metadata to datasource queries and/or filter responsive assets returned by BI tools 62. The Prompt Handler component may narrow the content provided to the User Interface/Application 68 to, for example, reflect the scope of the requesting end user's access rights and/or to reflect one or more content filters selected by the user, a developer and/or an administrator.

In an embodiment, the Prompt Handler component may narrow the datasource query according to the one or more authorization and/or selected filters before passing the query to adapters 70 for translation and presentation to corresponding BI tools 62, thereby propagating the limitation across the adapters 70 and datasources 64. In another embodiment, the Prompt Handler component may pass instructions to the adapters 70 to apply the one or more authorization and/or selected filters to the datasource query and/or the responsive results. In this manner, datasource queries may be appropriately narrowed before presentment to adapters 70 and/or BI tools 62 to reduce unnecessary translation and/or retrieval/storage of filtered responsive assets.

(B) Scheduler Component.

The Scheduler component may work with a Batch Processor component (discussed below) and/or other components to attach processing times to datasource query jobs. For instance, the Scheduler component may at least partially maintain a job database of datasource queries. The job database may be stored in the CDP Resource Repository component and/or the memory element 54, for example. In an embodiment, the job database may comprise a plurality of records, each record corresponding to a datasource query. Each record may include a status field (also discussed above) configured to store a plurality of flag values, each flag value corresponding to a present state and/or job status of the datasource query corresponding to the record, as discussed in more detail below.

The Scheduler component may execute an algorithm including a plurality of factors to determine—statically or dynamically—scheduled processing times for each of the datasource queries in the job database. The plurality of factors may include, without limitation: requested BI tool(s) for processing each job; existing backlog of queries for the requested BI tool(s); expected completion timeframe for backlog queries; priority flags submitted by requesting user(s); job size and other like factors, alone or in combination. The Scheduler component may gather data and information required to populate values for the factors considered by the algorithm from the adapters 70, the job database, an access database (discussed below), the CDP Resource Repository component and/or other components of the platform 60.

(C) Batch Processor Component.

The Batch Processor component may work in conjunction with the Scheduler component to manage prioritization and/or scheduling of batch data query processing. The Batch Processor component may also gather data and information required to perform the steps outlined herein from the adapters 70, the job database, the access database, the CDP Resource Repository component and/or other components of the platform 60.

In an embodiment, it is preferred that responsive assets from multiple BI tools 62 be retrieved from datasources 64 within a common timeframe. For example, it may be desirable for three (3) BI tools 62 invoked by a query to each provide responsive results within a ten (10) hour window, such that the results are representative of roughly the same data timeframe. The Batch Processor component may maintain and/or access job status records for the three (3) BI tools 62 in the job database. The records may indicate a processing backlog on one (1) of the three (3) BI tools 62 that would prevent processing of the query job within the preferred ten (10) hour window, assuming the other two (2) BI tools 62 were to process the job immediately. The Batch Processor component may therefore delay processing of the query by the other two (2) BI tools 62 sufficiently to ensure the query job can be completely processed within a common ten (10) hour window. For example, the Batch Processor component may treat the three (3) jobs stemming from a common query as a delayed "batch" awaiting the availability of the backlogged BI tool 62. In a preferred embodiment, the common data timeframe may be less than eight (8) hours and, more preferably, is less than two (2) hours.

For another example, the Batch Processor component may prioritize processing of job queries in batches to optimize load balancing or the like across the BI tools 62. One of ordinary skill will appreciate that a wide variety of algorithms and underlying logic/rules may drive batch processing of data retrieval jobs and the like within the scope of the present invention.

(D) Command Manager Component.

The Command Manager component may store and implement rules for ranking responsive results in connection with presentation to an end user by the User Interface/Application 68. For example, where a responsive result would normally be presented third ($3^{rd}$) to the end user under a default (e.g., "organic") ranking algorithm of the User Interface/Application 68, a business rule implemented by the Command Manager component may require re-ranking of the result to the first ($1^{st}$) position in the results list. Such a rule may, for example, result from a business decision seeking to increase visibility of the re-ranked result. Conversely, the Command Manager component may require lowering the ranking of a relevant responsive result, for example where the responsive result is embodied by a report having an undesirable aged format.

The Command Manager component may compare responsive results against such rule(s) according to indexing and/or parsing techniques, for example. Assets may be flagged as having one or more types and/or URIs, and the rule(s) may be triggered to operation upon encountering results exhibiting certain types/URIs. The Command Manager component may parse the assets of responsive results for one or more content indicators permitting automated classification into one or more type(s) and/or URIs. For instance, the Command Manager component may parse column headers of a responsive result having a table structured format to automatically classify the result as falling within an "Aggregate Payment Transactions (y) Plotted Against Time (x) for Multiple MCCs" type. Also or alternatively, the Command Manager may interface with an adapter 70 to request a designation from a datasource 64 and/or a developer may manually provide a value during the development process designating the asset for identification of the aforementioned type and/or as having a specified URI.

When a designated/classified asset appears as a result responsive to an end user query, the Command Manager component may check the type and/or URI of the asset against the rule(s), determine a match, and re-configure presentation of the result according to the rule. If no match is found to a rule, the Command Manager component may permit ranking to proceed according to the default ranking algorithm. One of ordinary skill will appreciate that a variety of techniques for indexing/classifying and/or correlating assets and/or rules of a command manager component are within the scope of the present invention.

In an embodiment, business rules implemented by the Command Manager may be applicable to certain categories of users, but not to others. For example, an exemplary result outlined above may be re-ranked by the Command Manager component for end users identified as external to an organization, but ranked according to the default ranking algorithm for internal end users. The Command Manager component may access and/or request data from the access database in connection with determining applicability of one or more rules to an end user. A variety of rules and parameters governing application thereof may be implemented by the Command Manager component within the scope of the present invention. Moreover, one of ordinary skill will appreciate that many options for re-ordering and/or otherwise emphasizing results—such as placement of one or more results in a dialog box dedicated to use by the Command Manager component—may be utilized in embodiments of the present invention.

(E) Search Component.

In conjunction with the Command Manager component, the Search component may aggregate and rank the responsive results of each datasource query, as described in more detail below in connection with FIG. 9.

(F) Mobile Component.

The Mobile component may manage communications between the platform 60 and computing devices 12 that comprise mobile devices running mobile applications. That is, native mobile applications may access and use the platform 60 via the Mobile component. The Mobile component may embody the architecture of known mobile application platforms on cloud servers—such as by running multiple users' virtual machines in a server via a hypervisor and/or by running multiple user applications in separate processes to provide access to the platform 60—without departing from the spirit of the present invention.

(G) Notifications/FCM Browser Push Component.

The Notifications/FCM browser push component may communicate with the Status Manager component (discussed below) and/or reference the job database and transmit and/or initiate notifications to users regarding job status changes, including by configuring the appropriate channel(s), content, and timing for the notifications.

The Notifications/FCM browser push component may include one or more rules governing notification operations. In an embodiment, the Notifications/FCM browser push component may include instructions for periodically querying the job database for status flags requiring a notification action that has not yet been performed. The Notifications/FCM browser push component may also at least partly maintain the job database and/or one or more notification databases for storage of notification preferences and data as well as status flags. In an embodiment, a developer may define the channel(s), format, content, timing and other aspects of notifications to be made available to end users of a User Interface/Application 68. The Notifications/FCM browser push component may manage storage of the developer configurations and of end user preferences.

The Notifications/FCM browser push component may utilize one or more rules, developer configuration(s) and/or end user preferences to determine that a notification should be generated and transmitted to the end user regarding a job status. The Notifications/FCM browser push component may query the job database periodically for status flags of one or more types that the end user has not yet been notified about. The Status Manager component may also or alternatively be configured to alert the Notifications/FCM browser push of each new status flag in the job database on a rolling and/or batch basis. Exemplary status flags may include "Data Available for Download," "Job Error," "Processing Delay," "Request Confirmation of Run," and so on and so forth. The Notifications/FCM browser push component may also access developer configuration(s) and/or end user preference data to determine whether identified status flags should be notified out to the end user and, if so, the appropriate channel(s), format, content, timing and other aspects of such a notification. The Notifications/FCM browser push component may also consult an end user consent data field in the job database (and/or the access database) to confirm that the end user has provided all required consents for a notification.

For example, user preference data may indicate that a job should run automatically as scheduled without the need for additional confirmation from the end user when the "Request Confirmation of Run" flag appears in the job database. This may cause the Notifications/FCM browser push component to automatically replace the "Request Conformation of Run" flag with a "Request Processing Time from Scheduler component" flag, which may then be acted on by the Scheduler component. For another example, a developer configuration may dictate that a "Job Error" status flag should cause the Notifications/FCM browser push component to automatically enter a new flag comprising "Request Processing Time from Scheduler Component" or to request the end user's confirmation before proceeding in this manner. It is foreseen that a variety of rules, status flags, developer configurations and/or personal preference data may be utilized for automated management of notifications by a Notifications/FCM browser push component without departing from the spirit of the present invention.

Once it is determined that a notification is to be generated, the Notifications/FCM browser push component may generate the notification according to developer configuration(s) and/or user preferences, for example with respect to the channel(s), format, content, timing and other aspects of the notification. In an embodiment, the notification may be sent via one or more of web browser, e-mail and mobile channels. The notification may enclose one or more assets (such as data reports and tables) and/or provide link(s) for accessing same. Also or alternatively, the Notifications/FCM browser push component may store the link/assets (e.g., in the CDP Resource Repository) and notify the User Interface/Application 68 of the location of the link/assets for access when requested by the end user.

The Notifications/FCM browser push component may provide the content of one or more notifications to a service (e.g., a push service), along with destination device/address information and/or end user identification information, for transmission/display of the notification(s) and/or monitoring of user interactions therewith. User interactions with the notification may be monitored by the User Interface/Application 68, a web browser and/or an agent associated with one or both of the foregoing. User interactions may be reported back to the Notifications/FCM browser push component for recordation and/or responsive actions (such as populating a status flag field with a value corresponding to a next stage of job processing). One of ordinary skill will appreciate that a variety of channels and technologies, and a variety of approaches to delivery and user feedback mechanisms, are within the scope of the present invention.

The Notifications/FCM browser push component may also implement sensitive data business rules to scan notifications and control redaction and/or delivery of notifications, as discussed in more detail below in connection with FIGS. 10-11.

(H) Status Manager Component.

The Status Manager component may issue downstream job processing requests (e.g., to adapters 70 and/or BI tools 62) alone or in conjunction with the Scheduler component and/or the Batch Processor component, and may at least partly maintain a job status flag for each datasource query within the job database. Moreover, the Status Manager component may maintain other data for each job and/or for aspects of queries other than datasource query status. For example, the Status Manager component may maintain status flag values relating to notification delivery and/or search result availability statuses, may record values relating to access propagation (e.g., database identifiers), or the like.

The Status Manager component may also issue instructions and/or otherwise transmit certain job status data upstream—e.g., to the Scheduler component and/or the Batch Processor component—to change scheduling and/or prioritization of jobs. It should be noted that a "job" refers generally to an action to be performed in connection with a datasource query.

The Status Manager component may be in constant communication with adapters 70 and other components of the platform 60 in order to receive, track and/or record changes in job status from responsible devices and components. For instance, each time responsive results from a datasource 64 query job are received by an adapter 70, the adapter 70 is preferably configured to store the received data and metadata in the CDP Resource Repository and record a related pointer to the location of storage. The adapter 70 may notify the Status Manager of the change in job status and provide the pointer for storage in the job database. One of ordinary skill will appreciate that the adapter 70 may omit passage of the pointer to the Status Manager within the scope of the present invention. It is foreseen that the Status Manager component may utilize a variety of approaches to managing job statuses without departing from the spirit of the present invention.

(I) Object Mapper Component.

The Object Mapper component may work in conjunction with the Prompt Handler component to map or otherwise apply filters (e.g., authorization and/or selected filters, also known as "prompts") to datasource queries and/or responsive results to narrow the content presented to the User Interface/Application 68. The Object Mapper component may also work in conjunction with the Scheduler component to determine which mapped datasource queries are schedulable. Further, the Object Mapper component may map assets exposed by BI tools 62 to price or cost data evidenced by corresponding contracts or agreements (for use in results ranking as discussed in more detail below) and/or to types/URIs to assist the functions of the Command Manager component outlined above.

Generally, the Object Mapper component may serve as the primary mapping resource for enabling a variety of functions of the platform 60. That is, the Object Mapper component may at least partly maintain one or more databases by defining relationships between and/or functions for converting between associated data elements. In an embodiment, the Object Mapper component may apply a function to a first data element to convert it to a second data element, may parse data to identify a first data element and relate it to a second data element, may look up a first data element to locate an associated second data element, or might otherwise function to interrelate and/or convert data and information used by the platform 60. For instance, the Prompt Handler component may store a plurality of prompts, and may request that the Object Mapper component map the prompts to proper corresponding datasource 64 queries.

(J) Authentication Component.

The Authentication component may translate data from the common authentication management framework into identity information for use in connection with end user datasource queries. In an embodiment, this includes translating a token (e.g., an SSO token) representing end user information into the identity information of the end user. The identity information may be used, for example, to determine the access rights enjoyed by the end user through reference to the access database and/or one or more authentication/authorization databases maintained by APIs 16. One of ordinary skill will appreciate that a variety of user information may comprise and/or be used to generate the identity information within the scope of the present invention. It is foreseen that the Authentication component may function in connection with a variety of common authentication frameworks without departing from the spirit of the present invention.

(K) Authorization Component.

The Authorization component may look up end user identity information in one or more user tables and/or in the access database at least partly maintained by the Authorization Source components (discussed below) or the like to determine one or more roles assigned to the user. The Authorization component may pass the role(s) to the Prompt Handler component and/or the Object Mapper component for continued handling of a user datasource query. The Authorization component may also pass the roles, token, and/or identity information to the adapters 70 for incorporation into datasource queries issued to the BI tools 62 and/or other authorization-related communications with the BI tools 62.

(L) Authorization Source Components.

The Authorization Source components may store user tables, active directory groups, tokens or the like and/or may at least partly maintain the access database for associating and/or mapping users to roles, user groups and/or other groupings and managing access rights in connection with queries. The Authorization Source components may also or alternatively respond to queries for access rights data from the other components of the platform 60 and/or from the BI tools 62.

For example, in an embodiment, an adapter 70 may pass a datasource query to a BI tool 62 with a security token and/or identity information translated therefrom. The BI tool 62 may, in turn, call the Authorization Source components with the security token and/or translated identity information to obtain access rights for the user and/or user group identified thereby (e.g., by reference to the user tables and/or access database).

For another example, an adapter 70 may pass a datasource query to a BI tool 62, and the BI tool 62 may call the Authorization Source components to obtain a token associated with the user that initiated the datasource query. In an embodiment, the Authorization Source components may reply according to methodologies and/or protocols such as those provided under the following trademarks as of the date of initial filing of the present disclosure: KERBEROS™ (propagated by the Massachusetts Institute of Technology); and Security Access Markup Language assertions (an open standard for exchanging security credentials). The Authorization Source components may embody an API for responding to calls from the BI tools 62 substantially as outlined above. It is foreseen that a variety of access authorization approaches may be implemented in embodiments of the present invention. In an embodiment, token generation and exchange with the APIs 16 is in accordance with the OAuth 2.0 protocol.

(M) CDP Resource Repository Component.

The CDP Resource Repository component may store URIs for assets exposed by the BI tools 62 and may pass URIs corresponding to each datasource query to adapters 70. In an embodiment, the URIs include roots (e.g., default roots) for sub-spaces to be searched pursuant to datasource queries. One of ordinary skill will appreciate that the CDP Resource Repository component may also act as a database cache and/or other memory for storing additional data required for operation of embodiments of the present invention.

(N) Self-Service Component.

The developer may choose to provide end users with access to the Self-Service component to enable further customization of responsive results presented to the end users. For example, an end user may be able to select from among the BI tools 62 enabled by the developer, customize report formatting, or otherwise configure and/or reconfigure the User Interface/Application 68 using the Self-Service component.

Figure 7:
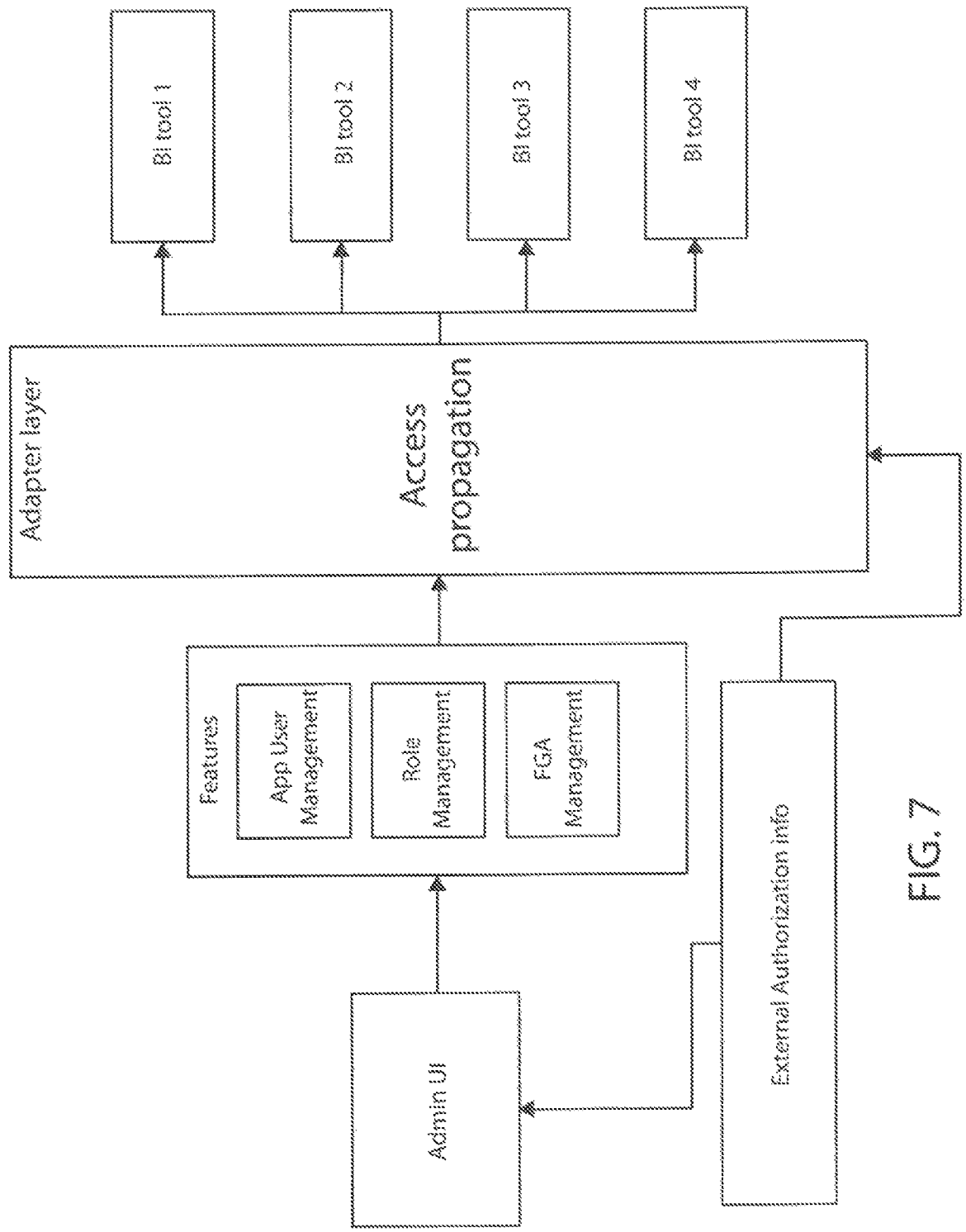
FIG. 7 is a flowchart of various components of exemplary systems for provisioning access rights, and of relationships between the components, in accordance with embodiments of the present invention.

Turning specifically to FIG. 6, a CDP Admin UI 72 may be embodied, controlled and/or executed by the computer 10. The CDP Admin UI 72 may be configured to add, update and/or delete access rights. More particularly, the CDP Admin UI 72 may include and/or provide access to conceptually and/or programmatically delineated programs and/or subroutines for performing one or more such functions. In the embodiments of FIGS. 6-7, these may include App User Management, Role Management and FGA Management components of the platform 60.

The App User Management component may permit an administrator to grant user access to particular user applications and/or groups of user applications (i.e., "domains"). The users may access and use such applications to issue and/or manage datasource 64 queries via computers 12. In an embodiment, the App User Management component may be configured to at least partly manage the access database, which may be stored in the CDP Resource Repository component and/or the memory element 24. The access database may comprise and/or cooperate with aspects of the Authorization Source component and/or the common authentication framework.

The access database may comport with role-based access control, discretionary access control, mandatory access control, other access control strategies and/or combinations thereof without departing from the spirit of the present invention. One of ordinary skill will appreciate that various structures for maintaining access control lists, groupings and/or permissions carry unique advantages and disadvantages. For instance, role-based access control may permit more granular access control for groups of people, whereas access control lists may be superior where individuals tend to require unique access separate and apart from a definable role. Moreover, the maintenance and storage of such access management frameworks may be dispersed across various components of the platform of embodiments of the present invention and/or the APIs 16 without departing from the spirit of the present invention. One of ordinary skill will appreciate that embodiments of the present invention may vary in the structure and disposition of access control mechanisms utilized for querying restricted-access databases.

In an embodiment, the access database may include a plurality of records, each record being keyed to at least one of a user, a group of users, an application and/or a group of applications. Each record may also include fields defining relationships between the user(s) and/or application(s). Relationships between users may be defined at least in part by user group designation(s), such as where each user group is given a user group designation code and fields of records identifying members of the same user group are populated by the same user group designation code. Relationships between applications may be defined at least in part by application group designation(s), such as where each application group is given an application group designation code and fields of records identifying applications of the same application group are populated by the same application group designation code.

Identifiers corresponding to each user, user group, application and/or application group may populate the records of the access database to define access relationships. Moreover, additional flags indicating a level of access may be appropriate for more fine-tuned access control. For instance, relationships between user(s) and application(s) may be defined at least in part by the App User Management component by applying one or more access right level flag(s), such as "Permitted," "Permitted-Restricted," "Denied" and/or other such designations to the records of the access database.

In an embodiment, each individual identified for use of the platform 60 may be identified personally (such as by a unique individual system identifier (ID)). The individual ID may serve as the primary key for each record of the access database. Each record may include fields populated with one or more of the following: user group designation(s), application designation(s) and/or application group designation(s). One or more of the aforementioned designation(s) may include corresponding sub-fields, for instance containing values or flags defining access level(s) such as those outlined above for each application or application group.

The App User Management component may instruct display of the records of the access database at the computer 10, e.g., at the CDP admin UI 72. For example, the App User Management component may organize the records outlined above into meaningful groupings within one or more fields or tiles on the display 30 and/or CDP admin UI 72. The App User Management component may include filters, indexing, search and/or other functionalities to assist a CDP admin user in assigning, deleting and/or modifying access rights. The App User Management component may utilize the CDP admin UI 72 to define and/or re-define relationships between user(s) and application(s). In an embodiment, the CDP admin user may conduct a drag-and-drop operation to move a designation representing a user/user group (i.e., individual ID, user group designation, or the like) and a designation representing an application/application group (i.e., application designation, application group designation, or the like) into the same field. This may signify grant to the user/user group of access rights to the application/application group, which may be recorded in the affected records of the access database. One of ordinary skill will appreciate that a wide variety of grouping and combinatorial approaches, user interface elements, and access definitions may be implemented in a platform to signify the granting of access rights within the scope of the present invention.

The Role Management component may permit a CDP admin user to assign roles to users and/or user groups and to assign fine grain access (FGA) to roles, as described in more detail below in connection with FIG. 8. A role may be defined to include users/user groups performing a job function and/or capacity, to include users/user groups having need of a type of access (e.g., "read only"), and/or may be otherwise defined according to a common characteristic. Generally, roles may correspond to user groups discussed above and/or may represent independent groupings without departing from the spirit of the present invention. For instance, a user may be in a user group referenced for purposes of defining broad-level application access rights and may be independently assigned one or more roles for purposes of defining data, report and/or tool access at the level of FGA (see discussion below). Moreover, roles and user groups may be defined with respect to one another, such as where a plurality of user groups are assigned to a role, and/or where one or more roles are assigned to a user group, in each case providing a more efficient way of automatically exporting access rights for end users. In an embodiment, placing a user group within a role may cause the platform 60 to automatically grant the individuals within the user group the FGA rights associated with the role. Membership of a user within a user group may determine access to and use of a User Interface/Application 68 more broadly, and assignment to a role may determine the data and/or data format(s) the user may access via the User Interface/Application 68. A role may also or alternatively be identical to a user group in terms of membership and/or FGA rights without departing from the spirit of the present invention.

The FGA Management component may permit a developer to group assets of one or more BI tools 62 together and assign them to one or more role(s) as a form of FGA definition, thereby consolidating access definitions for the grouped assets under the assigned role(s). FGA may include a plurality of relatively detailed definitions for permitted data and/or data format access. For example, FGA may define a data type and/or report format type within and/or comprising an asset, and may associate that definition with one or more roles. For another example, FGA may be manually defined during development of a User Interface/Application 68 to encompass a plurality of assets on a related topic. The definition of FGA and the assignment to one or more roles will be discussed in more detail below in connection with FIG. 8.

The Admin UI 72 may be utilized to at least partly build a User Interface/Application 68 (and/or its BI tool components 66) and/or at any other time to generate, delete and/or modify the access relationships outlined herein. For instance, an administrator and/or developer may utilize the Admin UI 72 to update access relationships for assets that are deleted or added following an initial setup and/or build process for the User Interface/Application 68. The Admin UI 72 may receive administrator and/or developer selections and provide them to the adapters 70 in real time for FGA definition and role assignment. It is foreseen that FGA may be assigned directly to one or more users without departing from the spirit of the present invention. One of ordinary skill will appreciate that functions outlined above and elsewhere herein and performed by depicted units of the Admin UI 72 may be otherwise distributed thereamong and/or performed by other program(s) without departing from the spirit of the present invention. The CDP Custom Authorization sub-component (see FIG. 5), the BI tools 62, the access database, other components and/or a combination of the foregoing may store the user, role and/or FGA definitions.

Returning to FIG. 7, External Authorization info may comprise or provide data obtained from third party databases and mapped to roles, users and/or user groups defined within the access database (e.g., within user tables). For example, where an external client user accesses the platform 60 to conduct one or more datasource queries, the platform 60 may look up or attempt to look up the external client user in the access database and may discover that a required role and/or FGA for completing the query is completely or partially undefined in and/or missing from the access database. That is, a parameter, argument and/or access right may be either missing or at least partly incomplete. The Authorization Source components may query the External Authorization info (e.g., via an API providing access to the External Authorization info). The call may pass an authentication token submitted when the external client user was initially authenticated by the platform 60 and/or other identity information, and may request additional data regarding the missing/partially incomplete parameter, argument and/or access rights of the external client user. The External Authorization info may include the requested data, which may be mapped to and/or otherwise incorporated into the access database and/or the datasource 64 query.

For example, where the platform 60 is maintained by a payment network, and the external client user is an authenticated employee of a financial institution, a database query for certain transaction data issued by the external client user may require that a more particular identifier (e.g., an Interbank Card Association number (ICA)) be passed with the query in order to fully define corresponding access rights to process the query. The platform 60 may note that the ICA is missing from the access database and may request that the External Authorization info residing at the financial institution's servers be queried for same before proceeding to issue a query to the BI tools 62. Also or alternatively, the missing argument or parameter may be identified following submission of the query to the BI tools 62, causing the Authorization Source components to seek the External Authorization info. It is foreseen that a wide variety of External Authorization info may be consumed and relied on, at least in part, to support authentication and/or authorization functions without departing from the spirit of the present invention.

Through hardware, software, firmware, or various combinations thereof, the processing elements 22, 32, 52 may—alone or in combination with other processing elements—be configured to perform the operations of embodiments of the present invention. Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled.

Exemplary Computer-Implemented Access Unification Method

Figure 8:
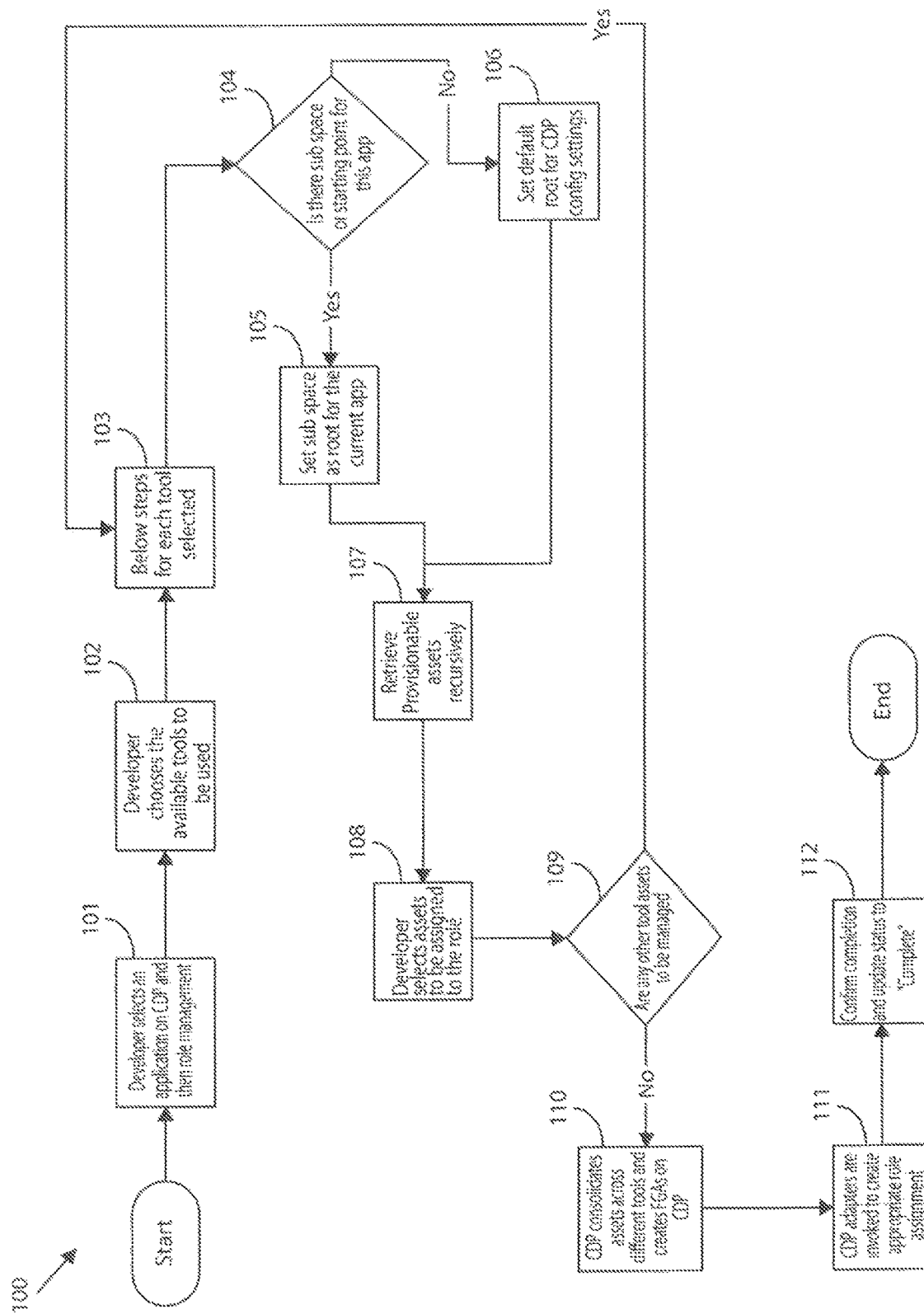
FIG. 8 is a flowchart illustrating at least a portion of the steps for provisioning access rights in accordance with embodiments of the present invention.

FIG. 8 depicts a flowchart including a listing of steps of an exemplary computer-implemented method 100 for access unification. The steps may be performed in the order shown in FIG. 8, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIGS. 1-7 and 9-10. For example, the steps of the computer-implemented method 100 may be performed by the computer 10, the server 14 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, a developer may select an application and activate a role management component of a platform. In an embodiment, the developer may utilize the CDP admin UI to activate the Role Management component of the platform 60 and, in conjunction, may begin or continue development of the User Interface/Application 68. The selected User Interface/Application 68 may be developed for use by end users within a topic area, such as "Fraud Detection." It is, however, foreseen that a user interface/application may be developed around any one or more topics without departing from the spirit of the present invention.

Referring to step 102, the developer may choose a plurality of tools for use with the application. In the exemplary embodiment, the selected tools may comprise BI tool 1 and BI tool 2 of the BI tools 62. In an embodiment, BI tool 1 and BI tool 2 comprise APIs 16. Corresponding features of the User Interface/Application 68 developed by the developer may be referred to as "BI tool 1 component" and "BI tool 2 component" of the BI tool components 66.

Referring to step 103, the developer may be prompted to or may otherwise choose to cycle through a series of steps (104-109) once for each selected tool. In the exemplary embodiment, the cycle is repeated twice—once for each of BI tool 1 and BI tool 2—as outlined below. The steps may be carried out by the CDP Admin services discussed above.

Referring to step 104, it may be determined whether there is a pre-programmed or otherwise readily available sub space or starting point for the present BI tool 62. That is, it may be determined whether the application is pre-programmed with and/or may otherwise automatically determine a sub space or starting point pointing to one or more pertinent resources on the BI tool 62 and/or datasource 64. In the exemplary embodiment, a sub space containing "Transaction Records" may be considered pertinent.

If a sub space is automatically determined according to step 104, according to step 105 the sub space is set as the root (i.e., a sub space URI under which provisionable assets may be found) for the present BI tool component 66. If not, according to step 106 the developer may select a default root for CDP configuration settings.

Referring to step 107, provisionable assets may be retrieved from the present BI tool 62 (via the corresponding adapter 70) using the root developed according to the above. The retrieved assets may comprise a listing of asset summaries, the assets themselves and/or a combination of the foregoing. The retrieved assets may be displayed at the CDP admin UI.

Referring to step 108, the retrieved assets may be reviewed by the developer, and the developer may select all or some for assignment to a role. In the exemplary embodiment, retrieved assets at the root of the present BI tool 62 may be reviewed for relevant BI data such as reports and/or data relating to fraud detection, and the developer may select same for inclusion in the present BI tool component 66.

The developer may also use the CDP Admin services to make more fine-grained selections of how and what selected report(s)/data may be provisioned by the User Interface/Application 68 when used by one or more end users. For example, the developer may confine the scope of an end user's access and/or define one or more filters and/or automatically appended metadata for use in narrowing the portion(s) of the selected assets the end user(s) may be provided access to.

Returning to an embodiment discussed above, the developer may configure the User Interface/Application 68 to require that an argument be provided indicating the ICA associated with any external client user before querying the present BI tool 62, effectively narrowing the data provided in the responsive results by ICA. One of ordinary skill will appreciate that any number of filters and/or parameters/arguments may be configured by the developer for operation with BI tool components within the scope of the present invention.

For another example, the developer may designate one or more type categorizations and/or URIs in connection with one or more of the selected assets for consumption by the Command Manager component, as discussed in more detail above. For yet another example, the developer may configure the channel(s), format, content, timing and other aspects of notifications to be made available to end users of a User Interface/Application 68. It is foreseen that any number of additional details may be specified with respect to selected assets—including by adding additional metadata regarding the selected assets to enable operation of other components of the platform 60—without departing from the spirit of the present invention.

Referring to step 109, it may be determined whether any additional assets are provisionable by the designated tools, and the cycle described above may be repeated for each remaining designated tool for which asset selection has not been completed. In the exemplary embodiment, the steps 103-109 are repeated twice—once each for BI tool 1 and BI tool 2. If no additional selected tools remain to be addressed, the method may proceed from the cycle of steps 103-109.

Referring to step 110, the platform 60 may consolidate the selected assets and create FGAs representing same. That is, the developer selections, configurations, and metadata gathered during development of the BI tool components 1, 2 may be consolidated for collective invocation in response to queries. In the exemplary embodiment, all of the developer selections, configurations, and metadata gathered during development of the BI tool components 1, 2 may be consolidated and identified for collective use by the User Interface/Application 68. More particularly, the unique set of assets and related configurations and metadata may be consolidated for use as "Fraud Detection" data available via the User Interface/Application 68.

Referring to step 111, adapters corresponding to the tools providing the selected assets may be invoked to create appropriate role assignment(s). In the exemplary embodiment, this may include each adapter 70 instructing the Object Mapper to associate one or more FGAs defined at least in part by the developer with a selected and/or new role designated by the developer, for example in the access database, the CDP Resource Repository component, and/or at each implicated BI tool 62 storing end user access data. The adapter(s) 70 may also pass reference information to the BI tool(s) 62 to enable the BI tool(s) 62 to specifically request end user rights data from the access database to authorize end user queries.

Each adapter 70 may additionally configure an appropriate query for retrieving selected assets—according to the developer's selections/configurations/FGAs—from the corresponding BI tool 62 and/or may instruct the Object Mapper to associate one or more types and/or URIs with one or more of the selected assets for use by the Command Manager. It is foreseen that a number of operations may be performed to convert the consolidated assets and associated configurations/settings selected by the developer into scripted instructions and database entries (for example) that may be automatically executed by the User Interface/Application 68 each time the selected assets are requested by an end user.

Referring to step 112, each adapter may confirm completion and return a "Complete" status indicator to the developer. The developer may, according to embodiments of the present invention, utilize the platform 60 to unify access to provisionable assets across a plurality of BI tools 62 employing a plurality of datasource structures, syntaxes, formats, languages or the like. Individual configurations, settings and/or FGAs may be defined once by the developer and propagated automatically across the various BI tools 62 into automated scripts and database entries for automated querying of restricted-access datasources 64 upon end user demand. Further, data filters and queries issued by the end user may be automatically propagated across the various BI tools 62 for automated querying of restricted-access datasources 64.

The method may include additional, less, or alternate steps and/or device(s), including those discussed elsewhere herein. For example, in embodiments where at least some end user authentication/authorization information is stored at the level of BI tools 62, the Admin services may be configured to automatically propagate any changes to an end user's authentication/authorization information across such BI tools 62. An administrator may edit the access database to reflect a change in an end user's status and/or authentication/authorization. The end user may remain in the same role, but may be assigned a new or alternative ICA which may be input by the administrator into the access database. The end user may switch roles and the administrator may input the new role into the access database. In each case, the Admin services and/or database management software may be configured to automatically set a propagation flag noting the change by the administrator and/or the administrator may make a manual selection of a desire for further action to be taken based on the change. The Admin services may also be configured to automatically propagate the changes to the end user's authentication/authorization from the access database based on the flag. For instance, the Admin services may periodically or continuously scan the access database for flags denoting unpropagated changes in one or more fields of the access database. For each such field referenced by a change flag, the Admin services may automatically invoke the adapters 70 and request that instructions be conveyed for corresponding revisions to end user access rights stored by each such BI tool 62.

Exemplary Computer-Implemented Database Query Method

Figure 9:
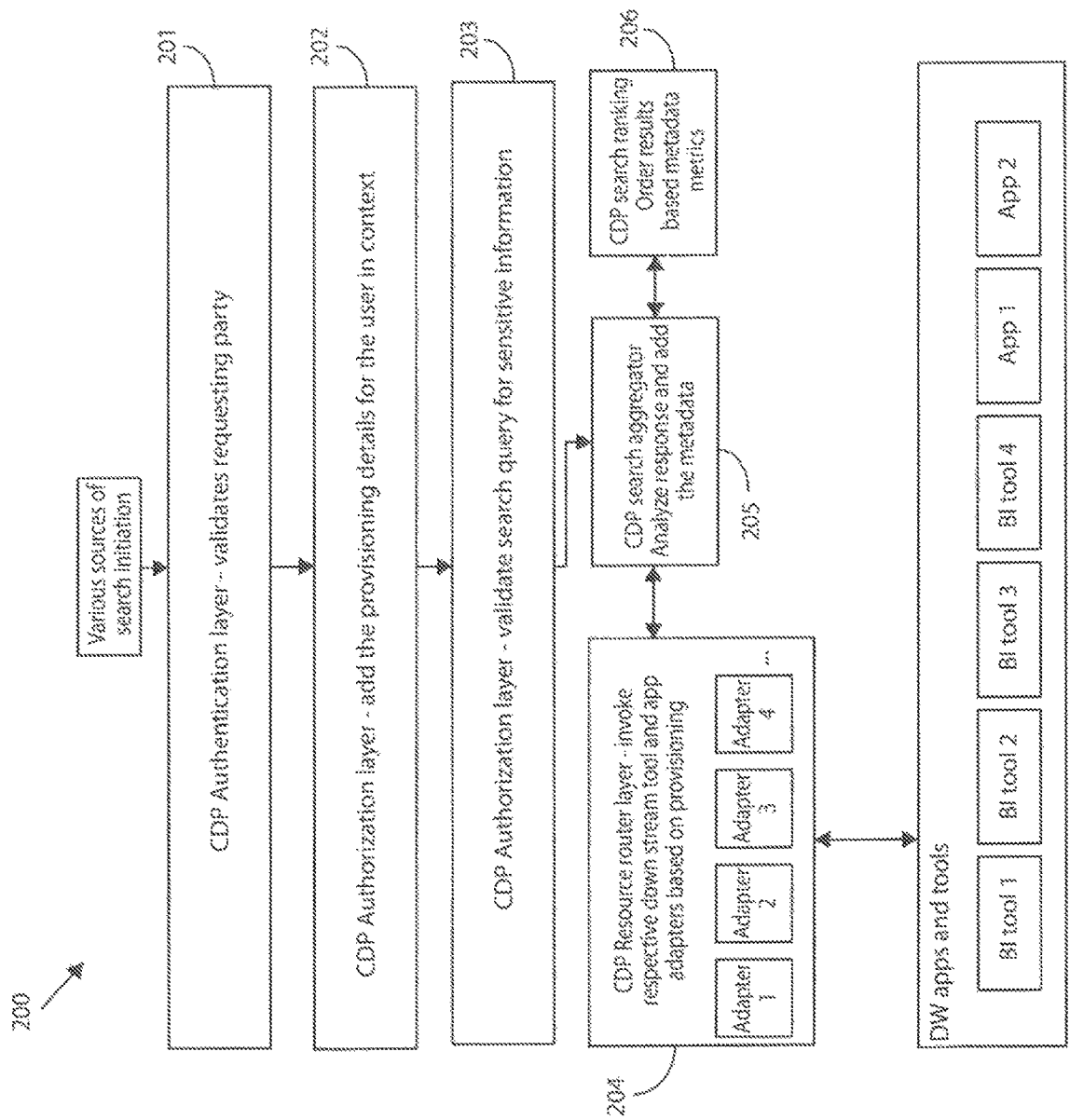
FIG. 9 is a flowchart of various components of exemplary systems for querying restricted-access databases and generating a consolidated results list, and of relationships between the components, in accordance with embodiments of the present invention.

FIG. 9 depicts a flowchart including a listing of steps of an exemplary computer-implemented method 200 for search aggregation, query propagation and result ranking. The steps may be performed in the order shown in FIG. 9, or they may be performed in a different order. Furthermore, some steps may be performed concurrently as opposed to sequentially. In addition, some steps may be optional.

The computer-implemented method 200 is described below, for ease of reference, as being executed by exemplary devices and components introduced with the embodiments illustrated in FIGS. 1-7 and 9-10. For example, the steps of the computer-implemented method 200 may be performed by the computers 10, 12, the servers 14, the APIs 16 and the networks 18, 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Initially, a datasource query may be initiated. An end user may access a User Interface/Application 68 to initiate the query, an automated Scheduler component may initiate the query, another server may initiate the query, or the query may be otherwise initiated within the scope of the invention. The datasource query may comprise descriptive data regarding assets an end user would like to retrieve at least in part by searching one or more restricted-access datasources 64. In an embodiment, the end user may access the User Interface/Application 68 to enter and/or select search criteria (e.g., a natural language search string) that causes initiation of the datasource query. For example, the end user may submit "debit transaction summary" as a search string into the User Interface/Application 68 built for "Fraud Detection."

Referring to step 201, the datasource query may be passed to an Authentication Layer of the platform 60, which may validate the end user. In an embodiment, the Authentication Layer may comprise and/or work in conjunction with the Authentication component of the platform 60 discussed above. For example, a security token associated with the end user (whether submitted in-session or stored in association with the query) may be validated. One of ordinary skill will appreciate that the Authentication Layer may validate the end user in connection with the datasource query according to a variety of protocols within the scope of the present invention.

Referring to step 202, the datasource query may be passed to an Authorization Layer, which may comprise and/or operate in conjunction with the Authorization component, the Prompt Handler component and/or the Object Mapper component discussed above and may add provisioning details for the end user in context. For instance, the provisioning details may cause otherwise responsive data and/or data types to be filtered from results presented to the end user because of insufficient access rights. In an embodiment, the platform 60 may obtain identity information translated from a token presented by the end user according to the common authentication management framework discussed above. The platform 60 may look up the identity information in the access database (and/or in a user table) to match the identity information against a known individual and/or group and retrieve associated roles and/or FGAs. The retrieved roles and/or FGAs may be appended as metadata to the datasource query or otherwise passed in connection with the datasource query.

The Authorization Layer may append other metadata and information to the datasource query. For instance, the appended metadata may include resource path information for each BI tool 62 and/or datasource 64 to be queried, which may be formatted as a sub-space address or root without departing from the spirit of the present invention. Such metadata may be provided by the CDP Resource Repository component. It is foreseen that the Authorization Layer may append additional metadata to aid in the submission of the datasource query to the BI tools 62 and/or in the interpretation and/or ranking of results without departing from the spirit of the present invention.

Referring to step 203, the Authorization Layer may—alone or in conjunction with the Notifications/FCM browser component—validate the search query for sensitive information. In an embodiment, the Authorization Layer and/or Notifications/FCM browser component may implement sensitive data business rules to scan the appended query and control rejection, redaction, replacement and/or submission operations according to the rules. The Authorization Layer may validate the search query utilizing an approach similar to that outlined below in connection with FIGS. 10-11 or may utilize other approaches without departing from the spirit of the present invention.

Referring to step 204, the appended query may be passed to a Resource Router Layer, which may invoke downstream adapters that correspond to BI tools to be invoked by the appended query. For instance, the developer of the User Interface/Application 68 may have respectively designated subspaces of BI tools 1, 3 and 4 for searches of the type initiated by the end user, but the provisioned role/FGA information of the appended query may not include access to the data of BI tool 3. The Resource Router Layer may therefore invoke downstream adapters 70 corresponding to BI tools 1 and 4 (and not BI tool 3). One of ordinary skill will appreciate that many protocols and methodologies for routing queries across multiple APIs according to this description may be within the scope of the present invention.

Each invoked adapter 70 may translate the appended query according to the syntax, data, format and/or language requirements of the corresponding queried BI tool 62. For instance, each invoked adapter may translate a natural language search string of the end user to a properly-formatted string query including parameters, arguments and/or resource names appropriate for the corresponding BI tool 62. In an embodiment, end user selections and/or queries may be translated to more appropriate input for each BI tool 62 using, for example, semantic matching operator software such as open source S-MATCH™ tools offered as of the filing date of this disclosure under a Lesser General Public License and/or according to mappings stored and implemented by the Object Mapper component. For instance, an adapter 70 may be pre-configured to utilize a semantic matching operator and/or the Object Mapper component to translate one or more words or phrases of natural language search strings to correspond more closely or exactly to the parameters, arguments, resource names and/or identifiers employed by the BI tool 62. As a particular example, the adapter 70 may be pre-configured—e.g., through accessing records describing the provisionable assets located according to processes outlined above—to translate "cardholder events" into "Transaction Records" and thereby reduce false negative search results.

The translated queries may respectively be submitted—along with resource path information and/or authentication/authorization information as appropriate—to each of the queried BI tools 62. The adapter(s) 70 and/or the Authorization Layer may also be configured to satisfy any recurring authentication/authorization protocols implemented by the various BI tools 62, for example by periodically renewing and/or refreshing security tokens to maintain access rights and privileges. In an embodiment, authorization information—e.g., the retrieved roles and/or FGAs determined according to the end user's identity information and appended to the datasource query as described above—may be relied on for generation of a plurality of security tokens respectively corresponding to each of the queried BI tools 62.

The queried BI tools 62 may respectively process the translated query—including by completing associated authentication/authorization operations described elsewhere herein—to generate lists of results. The queried BI tools 62 may incorporate the search string, role/FGA information, subspace resource paths and other information into search operations. One of ordinary skill will appreciate that the search may be conducted by the BI tools 62 in any number of ways—consistent with the corresponding translated query—within the scope of the present invention. That is, APIs may implement a wide variety of retrieval methodologies and processes without departing from the scope of the present invention. In an embodiment, existing text search tools offered by vendor BI tools 62 may be utilized.

Each list of results may, for example, include a plurality of entries. Each entry may refer to or include a data set matching the translated query. Each entry may include metadata about the data set and/or the originating resource path and/or BI tool 62. Each entry may also include a synopsis or snapshot of a small portion of the data set for optional presentation to the end user. It is foreseen that a wide variety of metadata may be appended to and/or made available with the results without departing from the spirit of the present invention. In an embodiment, the queried BI tools 62 may add a unique identifier to each retrieved entry.

The queried BI tools 62 may transmit the lists of entries to the corresponding adapters 70. The corresponding adapters 70 may translate the lists of entries into a universal format determined by the platform 60 broadly and/or developer settings more particularly. For example, the adapters 70 may be configured to translate and/or reconfigure the lists of entries so as to conform with a universal format for internal use by the platform 60. In an embodiment, originating resource path and/or BI tool 62 metadata may be added to each entry and/or each list of results by the corresponding adapters 70.

Referring to step 205, the adapters 70 may pass the translated results lists to a Search Aggregator component, which may analyze the results lists and append metadata thereto. For example, the Search Aggregator component may reformat resource path information received from the corresponding adapter 70 into a destination address for each entry (e.g., providing a link for end user interaction/retrieval). For other examples, the Search Aggregator component may append metadata the results regarding: usage metrics regarding previous user requests for each entry (e.g., as measured across all users of the platform 60 over time), which may be categorized by user role and/or group identification (e.g., to facilitate better-tailored ranking by relevance to the end user); access time and date metrics of at least some of the foregoing usage data (e.g., to prioritize ranking of entries more recently popular); costs associated with end user access/use (e.g., as determined under one or more data licenses); age of the asset format or type represented by each entry (e.g., newer resource/asset types may be ranked higher); average user access level/role metrics; and the like. Other metadata useful for ranking, linking and/or presentation operations may be appended by the Search Aggregator component without departing from the spirit of the present invention.

Referring to step 206, the Search Aggregator component may pass the appended results lists to a Search Ranking component. The Search Ranking component may consume the results lists and appended metadata to generate—alone or in conjunction with the Command Manager component— one or more ranked lists. For instance, the Search Ranking component may execute a default ranking algorithm employing weighted factors representing and/or consuming the appended metadata outlined above. The Search Ranking component may also incorporate any rules propagated under and/or may implement the instructions of the Command Manager component to override the ranking output by the default algorithm.

One of ordinary skill will appreciate that any number of weightings and/or factors may be implemented in the ranking algorithm within the scope of the present invention. For instance, standard relevance ranking factor(s) may be incorporated into the default ranking algorithm without departing from the spirit of the present invention. It is foreseen that the various factors, weightings, rules and the like implemented by Search Ranking component may be selected by the developer and/or by default according to platform 60 settings without departing from the spirit of the present invention. Moreover, one of ordinary skill will appreciate that one or more ranked lists may be output by the Search Ranking component without departing from the spirit of the present invention. In an embodiment, a single combined list of results (entries) commonly ranked under the algorithm may be output by Search Ranking.

The output search result list(s) of entries may be passed to the User Interface/Application 68 and/or via one or more notification channels for display to the end user and/or storage on an end user electronic device 12. Each entry may include a title, synopsis and/or destination address. Each entry may include more or fewer metadata without departing from the spirit of the present invention.

The end user may be permitted to select one or more of the entries, and to take further action as permitted according to developer settings. For example, the end user may click a link associated with an entry to visit the destination address for the entry and view the corresponding data set. For another example, the end user may select the entry and configure a recurring datasource query (e.g., in the form of a recurring report including the selected data set as it exists within the corresponding datasource 64 at each recurrence). For still another example, the end user may be permitted to configure one or more notifications for transmission when triggered by one or more status changes relating to processing of such recurring query(ies) (see discussion of the Notifications/FCM Browser Push component above and of FIGS. 10-11 below). The end user may select one or more channel(s), provide content for body message(s) and/or one or more notification title(s), select all or some fields that should be included to represent responsive results and/or metrics, apply one or more markers to one or more fields, and perform other customizations, selections and/or configurations. Some or all aspects of configuring notifications may be shifted from developer to end user (or vice versa) without departing from the spirit of the present invention. One of ordinary skill will appreciate that an end user may be permitted a variety of uses of the entries and/or the underlying datasets within the scope of the present invention.

According to embodiments of the present invention, individual filters, search queries, user login operations and the like may be input once by the end user and propagated automatically as search queries across the various BI tools 62. Moreover, responsive results may be automatically gathered from the various BI tools 62 and translated, converted and/or otherwise reformatted into a common form and ranked by the platform for presentation to the end user. The method may include additional, less, or alternate steps and/or device(s), including those discussed elsewhere herein.

Exemplary Computer-Implemented Secure Notification Method

Figure 11:
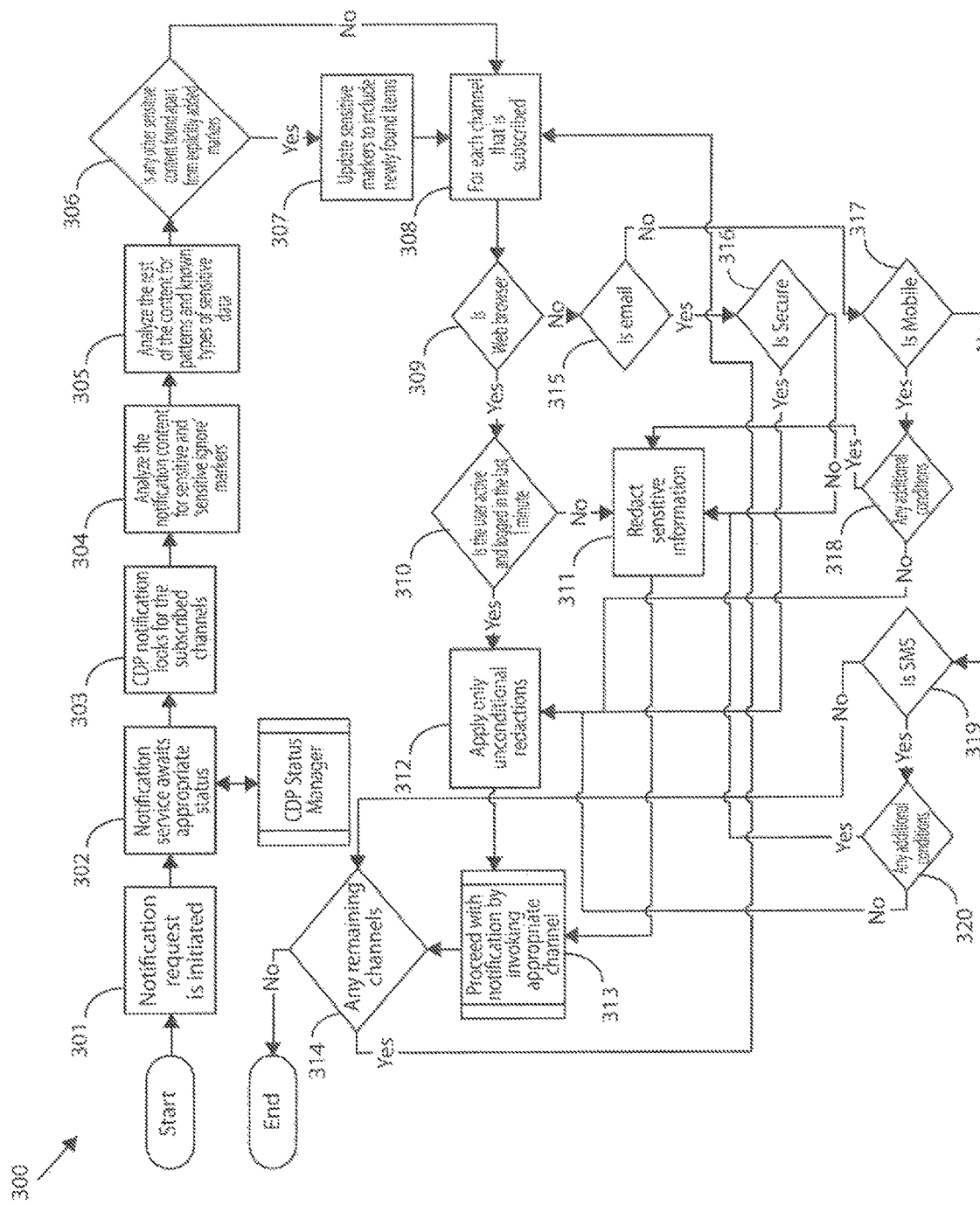
FIG. 11 is a flowchart illustrating at least a portion of the steps for generating job status notifications in accordance with embodiments of the present invention.

FIG. 11 depicts a flowchart including a listing of steps of an exemplary computer-implemented method 300 for generating and transmitting job status notifications to end users. The steps may be performed in the order shown in FIG. 11, or they may be performed in a different order. Furthermore, some steps may be performed concurrently as opposed to sequentially. In addition, some steps may be optional.

The computer-implemented method 300 is described below, for ease of reference, as being executed by exemplary devices and components introduced with the embodiments illustrated in FIGS. 1-7 and 9-10. For example, the steps of the computer-implemented method 300 may be performed by the computers 10, 12, the servers 14, the APIs 16 and the networks 18, 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Figure 10:
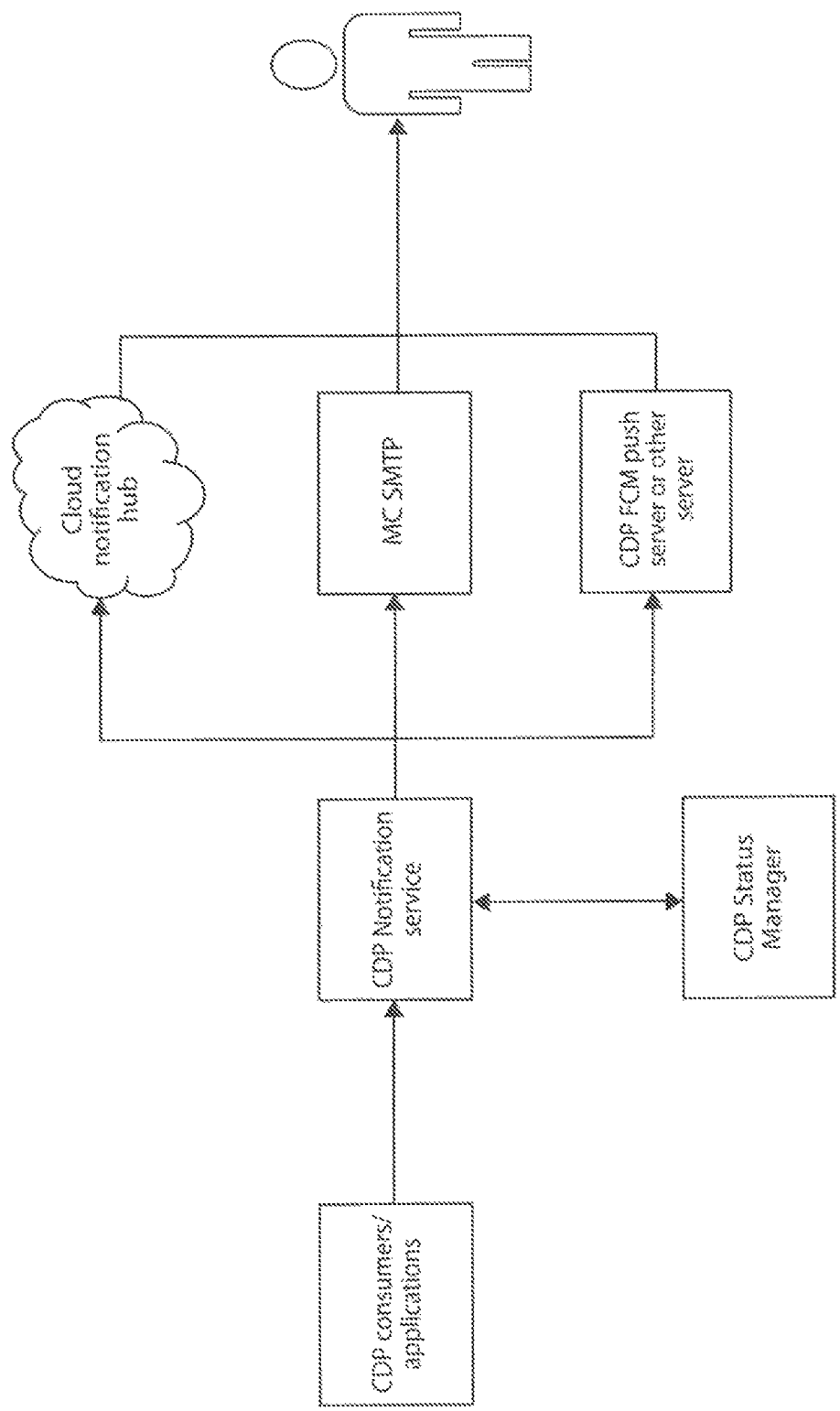
FIG. 10 is a flowchart of various components of exemplary systems for generating job status notifications, and of relationships between the components, in accordance with embodiments of the present invention.

Referring initially to the flowchart of FIG. 10, a secure notification method of embodiments of the present invention may generally be performed via end user or consumer applications, a notification service, a status manager, a cloud notification hub, a simple mail transfer protocol (SMTP), and/or a FIREBASE® cloud messaging (FCM) push server or the like. (FIREBASE® is a registered trademark of Google, Inc.) In an embodiment, the consumer application may comprise and/or work in conjunction with the User Interface/Application 68, the notification service may comprise and/or work in conjunction with the Notifications/FCM browser push component of the platform 60, and the status manager may comprise and/or work in conjunction with the Status Manager component of the platform 60.

Referring to step 301, a notification request may be initiated. In an embodiment, this may comprise an end user input to and/or an output of an automated function of, the User Interface/Application 68. As discussed in more detail above, the Notifications/FCM browser push component may receive the notification request. The notification request may include specification of one or more of the appropriate channel(s), content, timing and other characteristics of the requested notification(s).

Referring to step 302, the notification service may await a job status change corresponding to the notification request. For example, if the notification request relates to an end user's desire to be notified once results of a datasource 64 query become available, the Notifications/FCM browser push component may implement a rule for monitoring a data field of the job database for a "Query Processed—Results Available" status flag, alone and/or in conjunction with the Status Manager component.

The Notifications/FCM browser push component may also direct storage of the channel(s), content, timing and other characteristics of the requested notification(s) in the job database in association with the job(s) being monitored. In an embodiment, the characteristics of the requested notification(s) may be at least partly determined automatically by default settings for the requested notification(s) and/or by end user or developer input.

In an embodiment, the developer and/or end user may designate one or more fields of a notification and/or of responsive results with sensitive data markers. The sensitive data markers may be standard markers configured for use across the platform 60 according to a common syntax. For instance, each developer and/or end user may be provided an option to tag—via the Application UI Layer and/or the CDP admin UI—one or more text fields with one or more standardized markers recognized by the Notifications/FCM browser push component. In an embodiment, the markers may comprise: "Sensitive—Always Redact," "Sensitive—Redact Insecure Channels," "Sensitive—No Redaction/Ignore," and so on and so forth.

The markers may be data-agnostic. That is, the markers may be applied to physically empty text fields with the understanding that once a notification is generated and/or responsive results are retrieved, the text that will populate the marked fields will be of the variety indicated by the marker. The markers may also be conditioned on the data ultimately populating a text field. For instance, the developer and/or end user may configure and/or select one or more rules for parsing the data ultimately populating a text field of a notification, for example using a marker labeled "Conditionally Sensitive—Check for Social Security Number." In this manner, the end user and/or developer may fine-tune the parsing operations of the Notifications/FCM browser push component to save processing time and produce fewer false positives and/or false negatives. Further, the notification(s) may contain stock text and/or data that will always appear—such as an end user employee's internal ID number—and such text field(s) may therefore be confidently labeled with a marker (e.g., "Sensitive—Redact Insecure Channels"). One of ordinary skill will appreciate that a variety of markers and fields may be implemented within the scope of the present invention.

Markers may be stored at the direction of the Notifications/FCM browser push component in the job database. It is foreseen that the markers may be stored elsewhere—such as in the CDP Resource Repository component—and/or at the direction of a different component of the platform 60 without departing from the spirit of the present invention.

Referring to step 303, once the appropriate status occurs the notification service may determine one or more channels for notification delivery. In an embodiment, the Notifications/FCM browser push component may identify the "Query Processed—Results Available" flag in a field of the job database corresponding to the monitored job and may reference one or more other fields of the record to determine one or more channels through which to send the requested notification. For example, the end user may have requested notifications be provided via web browser, email and mobile mediums. The Notifications/FCM browser push component may also receive and/or generate an initial version of the content of the requested notification—e.g., in the form of a body message and, optionally, all or some of the responsive results. The initial version of the content may be generated at least in part by referencing the requested notification metadata outlined above and stored in the job database.

For example, the body message may populate one or more text fields, reading: "Hello [Insert End User Name], Your [Insert Data Report Title] has been updated for the month of

[Insert Data Timeframe] and is now available at [Insert URI]. The Report may be accessed using your [Insert Employee ID #] username and password." Exemplary responsive results and/or summarized data fields and/or metrics may be included with the body message in one or more text and/or graphical fields, for example. One or more of the aforementioned fields—for example, [Insert Employee ID #]—may be designated by the developer with a marker such as "Sensitive—Redact Insecure Channels."

Referring to step 304, the initial version of the content of the requested notification may be analyzed for markers, for example as part of a notification finalization process. In an embodiment, the Notifications/FCM browser push component may first scan the initial version of the content and identify one or more markers placed by the end user and/or according to developer customization(s). For example, the marker "Sensitive—Redact Insecure Channels" attached to the [Insert Employee ID #] text field may be recognized and recorded for potential future action. For another example, a customized marker such as "Conditionally Sensitive—Check for Social Security Number" may be recognized as attached to a responsive results summary field of the initial version of the notification and recorded.

Referring to step 305, the initial version of the content of the requested notification may be analyzed more generally for content determined to be "sensitive" according to one or more rules. The Notifications/FCM browser push component may implement a variety of rules for parsing text data or the like to identify likely sensitive data. In an embodiment, pattern matching algorithms—such as brute force, linear-time exact, regular expression algorithms or the like and/or combinations of the foregoing—may be employed to detect sensitive information in the initial version of the content. For example, data may be of the form XX/XX/XXXX—where "X" represents a number—and therefore may be marked as potentially being a date of birth. For another example, data may be of the form XXX-XX-XXXX and therefore may be marked as potentially being a social security number. The Notifications/FCM browser push component may also implement one or more algorithms according to developer/end user markers, such as where a particular algorithm for recognizing social security numbers is utilized to scan the field marked by the developer/end user with "Conditionally Sensitive—Check for Social Security Number." One of ordinary skill will appreciate that a wide variety of algorithms and automated functions may be used to identify potentially sensitive data within the scope of the present invention.

Referring to step 306, the results of scanning the initial version of the content may be used to determine whether any additional, unmarked sensitive content was found. Referring to step 307, markers may be added to reflect the results. If one or more scanning algorithms identify actual or likely sensitive data in one or more fields of the initial version of the requested notification, the Notifications/FCM browser push component may apply a marker to the field(s) according to one or more rule(s). For example, fields considered likely to contain social security number(s) may be marked "Sensitive—Always Redact" whereas fields considered likely to contain customer account numbers may be marked "Sensitive—Redact Insecure Channels."

Referring to step 308, a series of actions may be initialized to finalize a notification for each subscribed channel. In an embodiment, the Notifications/FCM browser push component may access and/or determine the subscribed channel(s) and call, import and/or execute a pre-determined series of actions for preparing a finalized notification for each such subscribed channel.

Referring to steps 309-310, for a web browser notification it may be determined whether the requesting end user has been active and/or logged in within a pre-determined period. The platform 60 may, for example, periodically and/or continuously receive and record end user activity information from: inputs and/or user requests submitted to the platform 60; browser plugins, add-ons, extensions and/or other agent software installed on computers 12; and/or the common authentication management framework. The Notifications/FCM browser push component may estimate, based on such information, whether it is likely that the end user may be available to view the web browser notification in real-time if transmitted. The pre-determined period may be one (1) minute, though the length may vary based, for example, on the average degree of sensitivity of the data subject to redaction.

Referring to step 311, if the end user activity does not satisfy the determination outlined above, corresponding redaction may be made to the initial version of the content. For example, the Notifications/FCM browser push component may reference all markers attached to the initial version and perform all unconditional redactions and all conditional redactions dependent on the channel being deemed presently insecure (i.e., inactive user in a web browser channel). The performance of such redaction(s), and any other configurations and/or customizations flowing therefrom, may constitute finalization of the web browser notification. Alternatively, rather than redacting and sending a notification if the end user activity does not satisfy the determination outlined above, the Notifications/FCM browser may delay transmission until the determination is satisfied or may cancel the notification.

Referring to step 312, if the end user activity satisfied the determination outlined in connection with step 310, corresponding redaction may be made to the initial version of the content. For example, the Notifications/FCM browser push component may reference all markers attached to the initial version and perform all unconditional redactions (i.e., those to be made even for presently secure web browser channel notifications). The performance of such redaction(s), and any other configurations and/or customizations flowing therefrom, may constitute finalization of the web browser notification. Referring to step 313, the finalized web browser notification may be output and the appropriate web browser notification service may be invoked for transmission. (See FIG. 10)

Referring to step 314, it may be determined whether one or more finalized notifications remain to be sent across additional channel(s). Referring to step 315, it may be determined whether an end user has requested delivery of a finalized notification via email. Referring to step 316, if the end user has requested an email notification, it may be determined whether the identified email service and/or server are secure. In an embodiment, a list of secure email services (e.g., utilizing mutual keys) may be compared against the end user-specified email address to determine whether the service is secure. It is foreseen that a variety of methods for determining whether an email service is secure may be used without departing from the spirit of the present invention. If the email service is determined to be secure, the initial version of the notification may be modified by performance of only unconditional redactions (see description of step 312 above) and, if not, the insecure channel redaction steps may be performed (see description of step 311 above).

An appropriate channel for transmitting the resulting finalized email notification may be invoked (see description of step 313 above).

Referring to steps 317-318, if the end user has requested a mobile notification, it may be determined whether factors/conditions indicate secure delivery is possible. For instance, the Notifications/FCM browser push component may be pre-configured with and/or may reference developer configurations/settings for determining secure circumstances for delivery. The developer may have previously indicated one or more factors and/or conditions—such as login status, recipient device type, recipient device operating system, etc.—governing whether a secure mobile notification may be completed. If the factors and/or conditions for secure delivery are satisfied, the initial version of the notification may be modified by performance of only unconditional redactions (see description of step 312 above) and, if not, the insecure channel redaction steps may be performed (see description of step 311 above). An appropriate channel for transmitting the resulting finalized mobile notification may be invoked (see description of step 313 above).

Referring to steps 319-320, if the end user has requested an SMS notification, it may be determined whether factors/conditions indicate secure delivery is possible. For instance, the Notifications/FCM browser push component may be pre-configured with and/or may reference developer configurations/settings for determining secure circumstances for delivery. The developer may have previously indicated one or more factors and/or conditions governing whether a secure SMS notification may be completed. If the factors and/or conditions for secure delivery are satisfied, the initial version of the notification may be modified by performance of only unconditional redactions (see description of step 312 above) and, if not, the insecure channel redaction steps may be performed (see description of step 311 above). An appropriate channel for transmitting the resulting finalized SMS notification may be invoked (see description of step 313 above).

It should be noted that the order of finalizing notifications across the various channels outlined herein can vary without departing from the scope of the present invention. Once finalized notifications have been transmitted for all end user-requested channels, the Notifications/FCM browser push component may record completion of report-out functions corresponding to the requested notifications and the requested job status/job in the job database.

The Notifications/FCM browser push component may also receive input in reply to one or more of the transmitted notifications, such as where the user requests the Notifications/FCM browser push component to change a status flag in the job database in reply to the transmitted notification(s). For example, where "Job Error" notifications were transmitted, the transmitted notifications may have queried the end user to select either "Resubmit Job" or "Dismiss Job for this Data Timeframe." The resulting selection by the end user may be received by the Notifications/FCM browser push component, which may enter a corresponding status flag in the job database to signal to the other components of the platform 60 (e.g., the Status Manager) regarding remaining actions to be taken regarding the job and/or datasource 64 query.

Another type of input received from end users may comprise indications of false positive and/or false negative markers. For instance, where a redaction has occurred in error and/or where a redaction should have occurred but did not, the end user may provide feedback indicating same to the developer and/or platform 60 more broadly. If the errors resulted from an end user selection and/or erroneously placed developer/end user marker, the platform 60 may make corresponding corrections to the markers of the notifications. If the errors resulted from the output of a scanning algorithm employed by the platform—e.g., where a pattern matching algorithm failed to recognize sensitive data—the platform 60 may automatically adjust the weightings and/or other aspects of the offending algorithm(s) to address the error. Such correction may optionally be implemented in conjunction with and/or through execution of a machine learning program. The machine learning program may include curve fitting, regression model builders, convolutional or deep learning neural networks, Bayesian machine learning techniques, or the like. The machine learning program may associate patterns from end user feedback with scanning algorithm characteristics and/or outputs to inform recognition of error patterns, iteratively improving such scanning algorithm(s).

Individual notification configurations, settings and/or contents may be defined once by the developer and/or end user and propagated automatically across jobs invoking various BI tools 62 and across time. The method may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as transceiver elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for secure multi-datasource query job status notification comprising, via one or more transceivers and/or processors:
   accessing notification characteristics for a query job status;
   determining occurrence of the query job status;
   determining a present security level;
   based on the notification characteristics, generating a notification at least in part by omitting available data based on the present security level, the omitting of available data including redacting an initial version of the notification at least in part by scanning the initial version of the notification using a pattern matching algorithm, identifying a text field containing sensitive data, and applying a marker to the text field corresponding to the identification by the pattern matching algorithm; and based at least in part on the occurrence of the query job status, directing transmission of the notification to an end user computing device.

2. The computer-implemented method of claim 1, wherein the determined query job status reflects completion of a query propagated across a plurality of datasources.

3. The computer-implemented method of claim 1, wherein the omitting of available data includes redacting the initial version of the notification at least in part by recognizing an unconditional redaction marker referencing a second text field of the initial version and redacting one or more characters populating the second text field.

4. The computer-implemented method of claim 1, wherein the omitting of available data includes redacting the initial version of the notification at least in part by recognizing a redaction marker conditioned on the present security level, determining that the present security level does not satisfy a condition of the redaction marker, and redacting one or more characters populating a second text field referenced by the redaction marker.

5. The computer-implemented method of claim 1, wherein the pattern matching algorithm is specified by an initial marker applied by an end user.

6. The computer-implemented method of claim 1, wherein a second text field referenced by a second marker applied by an end user is not scanned by the pattern matching algorithm.

7. A system for secure multi-datasource query job status notification, the secure notification system comprising one or more processors individually or collectively configured to execute computer-executable instructions stored on non-transitory computer-readable storage media to:

access notification characteristics for a query job status;
determine occurrence of the query job status;
determine a present security level;
based on the notification characteristics, generate a notification at least in part by omitting available data based on the present security level, the omitting of available data including redacting an initial version of the notification at least in part by scanning the initial version of the notification using a pattern matching algorithm, identifying a text field containing sensitive data, and applying a marker to the text field corresponding to the identification by the pattern matching algorithm; and based at least in part on the occurrence of the query job status, direct transmission of the notification to an end user computing device.

8. The secure notification system of claim 7, wherein the determined query job status reflects completion of a query propagated across a plurality of datasources.

9. The secure notification system of claim 7, wherein the omitting of available data includes redacting the initial version of the notification at least in part by recognizing an unconditional redaction marker referencing a second text field of the initial version and redacting one or more characters populating the second text field.

10. The secure notification system of claim 7, wherein the omitting of available data includes redacting the initial version of the notification at least in part by recognizing a redaction marker conditioned on the present security level, determining that the present security level does not satisfy a condition of the redaction marker, and redacting one or more characters populating a second text field referenced by the redaction marker.

11. The secure notification system of claim 7, wherein the pattern matching algorithm is specified by an initial marker applied by an end user.

12. The secure notification system of claim 7, wherein a second text field referenced by a second marker applied by an end user is not scanned by the pattern matching algorithm.

13. A non-transitory computer-readable storage media having computer-executable instructions for secure multi-datasource query job status notification stored thereon, wherein when executed by at least one processor the computer-executable instructions cause the at least one processor to:

access notification characteristics for a query job status;
determine occurrence of the query job status;
determine a present security level;
based on the notification characteristics, generate a notification at least in part by omitting available data based on the present security level, the omitting of available data includes redacting an initial version of the notification at least in part by scanning the initial version of the notification using a pattern matching algorithm, identifying a text field containing sensitive data, and applying a marker to the text field corresponding to the identification by the pattern matching algorithm; and based at least in part on the occurrence of the query job status, direct transmission of the notification to an end user computing device.

14. The non-transitory computer-readable media of claim 13, wherein the omitting of available data includes redacting the initial version of the notification at least in part by recognizing an unconditional redaction marker referencing a second text field of the initial version and redacting one or more characters populating the second text field.

15. The non-transitory computer-readable media of claim 13, wherein the omitting of available data includes redacting the initial version of the notification at least in part by recognizing a redaction marker conditioned on the present security level, determining that the present security level does not satisfy a condition of the redaction marker, and redacting one or more characters populating a second text field referenced by the redaction marker.

16. The non-transitory computer-readable media of claim 13, wherein the pattern matching algorithm is specified by an initial marker applied by the end user.

17. The non-transitory computer-readable media of claim 13, wherein a second text field referenced by a second marker applied by the end user is not scanned by the pattern matching algorithm.

* * * * *